April 11, 1950     R. J. WISE ET AL     2,503,311
FACSIMILE TRANSMISSION APPARATUS Filed Feb. 25, 1946     12 Sheets-Sheet 2

INVENTORS
R. J. WISE
R. D. PARROTT
G. H. RIDINGS

BY *A. A. Thomas*

ATTORNEY

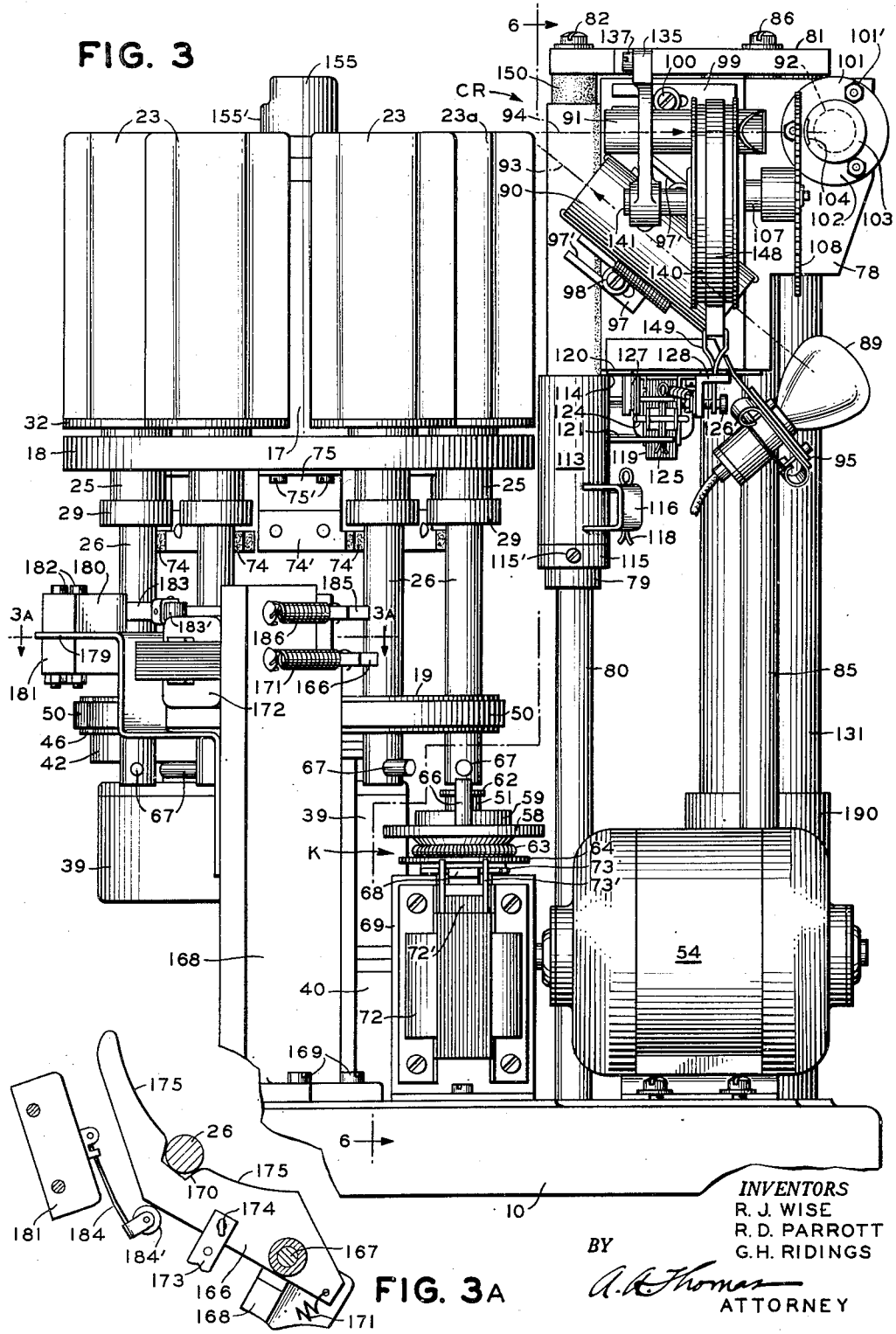

April 11, 1950 R. J. WISE ET AL 2,503,311
FACSIMILE TRANSMISSION APPARATUS
Filed Feb. 25, 1946 12 Sheets-Sheet 4

INVENTORS
R. J. WISE
R. D. PARROTT
G. H. RIDINGS
BY
*A. A. Thomas*
ATTORNEY

INVENTORS
R. J. WISE
R. D. PARROTT
G. H. RIDINGS
BY
A. G. Thomas
ATTORNEY

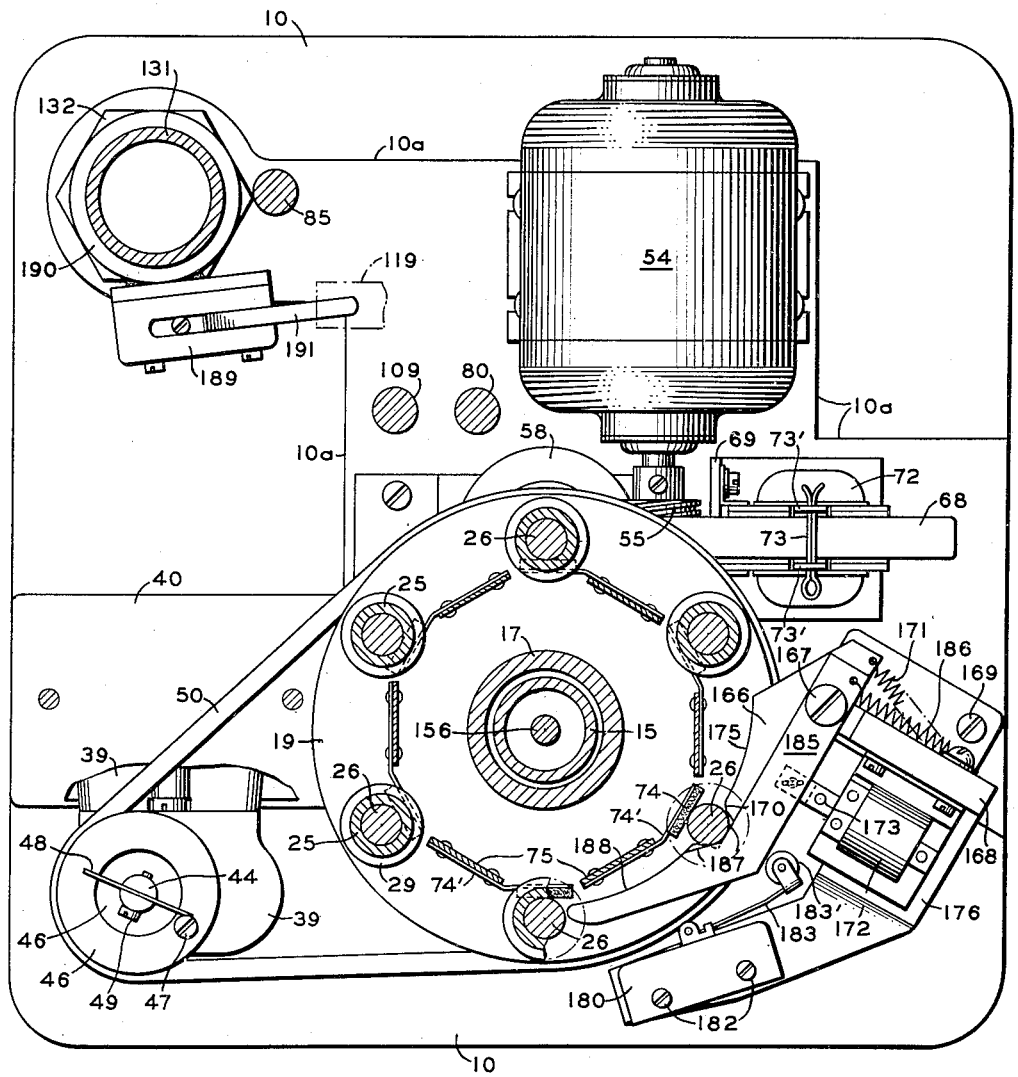
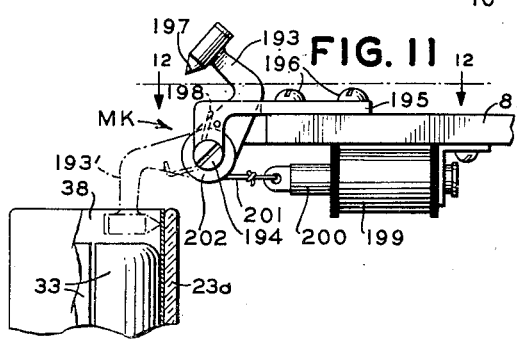
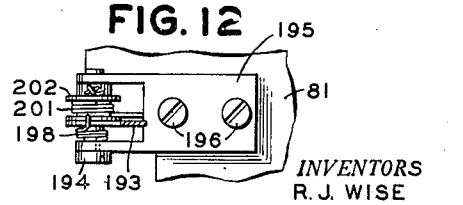

April 11, 1950 R. J. WISE ET AL 2,503,311
FACSIMILE TRANSMISSION APPARATUS
Filed Feb. 25, 1946 12 Sheets-Sheet 8

INVENTORS
R. J. WISE
R. D. PARROTT
G. H. RIDINGS
BY
A. A. Thomas
ATTORNEY

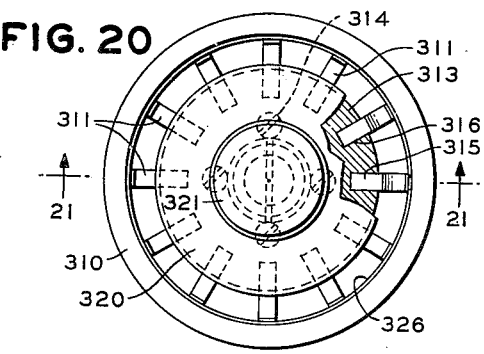
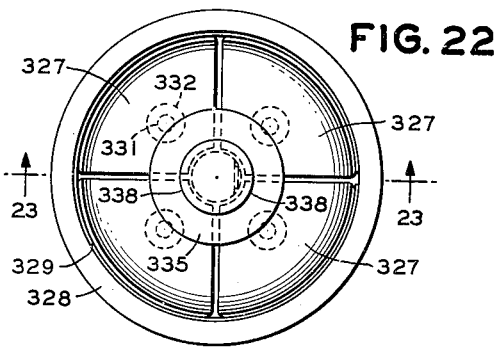
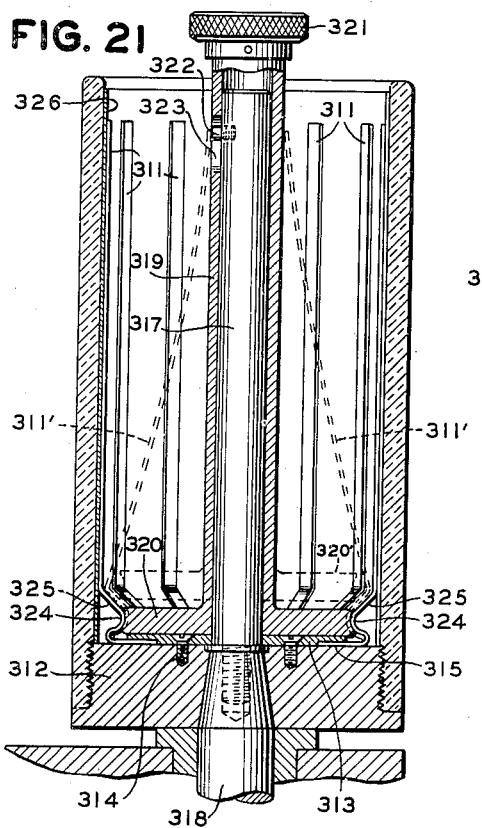
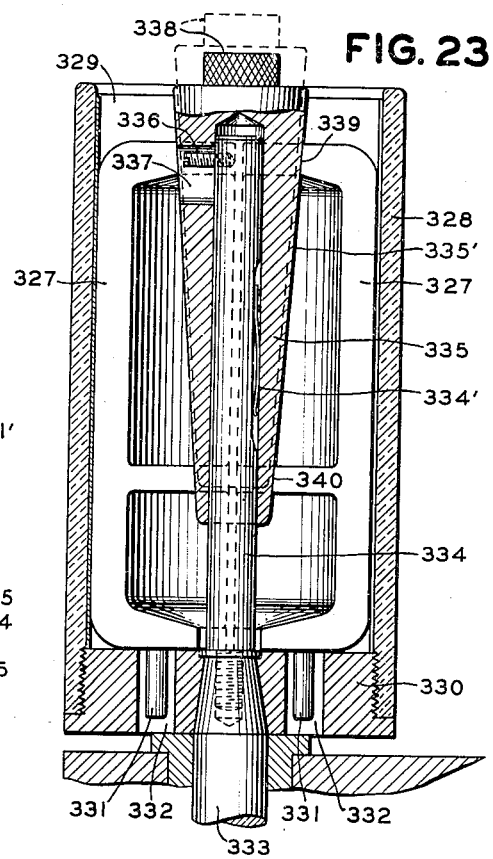
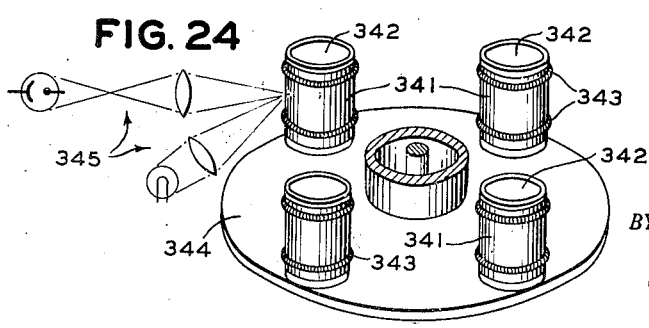
INVENTORS
R. J. WISE
R. D. PARROTT
G. H. RIDINGS
BY
A. A. Thomas
ATTORNEY Patented Apr. 11, 1950

2,503,311

UNITED STATES PATENT OFFICE 2,503,311

FACSIMILE TRANSMISSION APPARATUS

Raleigh J. Wise, Dunellen, Robert D. Parrott, West New York, and Garvice H. Ridings, Summit, N. J., assignors to The Western Union Telegraph Company, New York, N. Y., a corporation of New York Application February 25, 1946, Serial No. 650,074

33 Claims. (Cl. 178—6.6)

This invention relates to facsimile telegraphy and its general object is to provide novel transmitting apparatus capable of being loaded with a plurality of messages which are scanned in automatic sequence. A machine of that kind presents special advantages in various commercial applications of facsimile transmission.

In a preferred form of our invention as embodied in a transmitter built for commercial use, we employ a turntable which carries a series of vertical cylinders (six in this case) for receiving copies to be scanned. A single scanning device takes care of all the cylinders, which are moved into scanning position one after the other by the intermittent operation of the turntable. After loading the cylinders, the attendant closes a starting switch and from thereon the machine operates automatically, transmitting the messages in sequence to a recorder. When the last copy has been sent, the machine stops itself. As will appear later, certain operations of the transmitter are controlled by the recorder, whereby the two machines cooperate for the automatic transmission of a plurality of copies.

In the actual use of our transmitter there is no limit to the number of messages that can be sent in automatic sequence. While a cylinder is being scanned, the turntable and the other cylinders stand still so that the attendant can remove the scanned copies and load the empty cylinders with fresh material. By thus keeping the cylinders loaded the machine operates without interruption until the last message has been transmitted.

At the present time we prefer to use transparent scanning cylinders open at the top for inside loading. The copy sheets are coiled up and pushed down into the cylinders. This can be done quickly and requires no skill. Each cylinder is provided inside with novel means for holding the inserted copy firmly against the transparent cylinder wall through which the optical scanning takes place. A scanned copy can be lifted out of its cylinder and a fresh copy inserted in less than a minute during a stationary interval of the turntable without interfering with the automatic operation of the machine.

It may happen sometimes that not all the cylinders are loaded with copy when the machine is started. To prevent waste of time and power by the scanning of empty cylinders we have an arrangement for so adjusting the machine that it will stop automatically after scanning of the last loaded cylinder. This adjustment is effected by simply moving an indicator to proper position.

It is further desirable that the attendant shall be able to distinguish between scanned and unscanned copies and for this purpose we provide an automatic device which marks a scanned copy before its removal from the cylinder.

Our multi-cylinder transmitter is a self-contained unit so compact that it can be placed on a stand or table like a typewriter or other office machine. This feature of compactness is due to the novel operating mechanism in the machine and is important from a commercial standpoint. There are many practical applications of our machine. The copies in the scanning cylinders may be standard telegram sheets or card forms used in certain business transactions, such as aeroplane reservations, or any other kinds of records containing information to be facsimiled to a distant point. Our machine is specially adapted for transmitting long messages that require a number of cards or sheets. These are inserted into the cylinders in consecutive order and the machine does the rest.

The various novel features that characterize our invention will be explained in a description of the accompanying drawings in which—

Fig. 3 shows the right side of the machine;

Fig. 3A is a section on line 3A—3A of Fig. 3;

Fig. 7 represents a horizontal section on line 7—7 of Fig. 1;

Fig. 10 (sheet 5) shows a switch operating detail on section line 10—10 of Fig. 5, the switch being in closed position;

Fig. 10A is a view similar to Fig. 10 with the switch in open position;

Fig. 11 (sheet 7) shows a device for marking a scanned copy;

Fig. 12 is a section on line 12—12 of Fig. 11;

Figure 16:
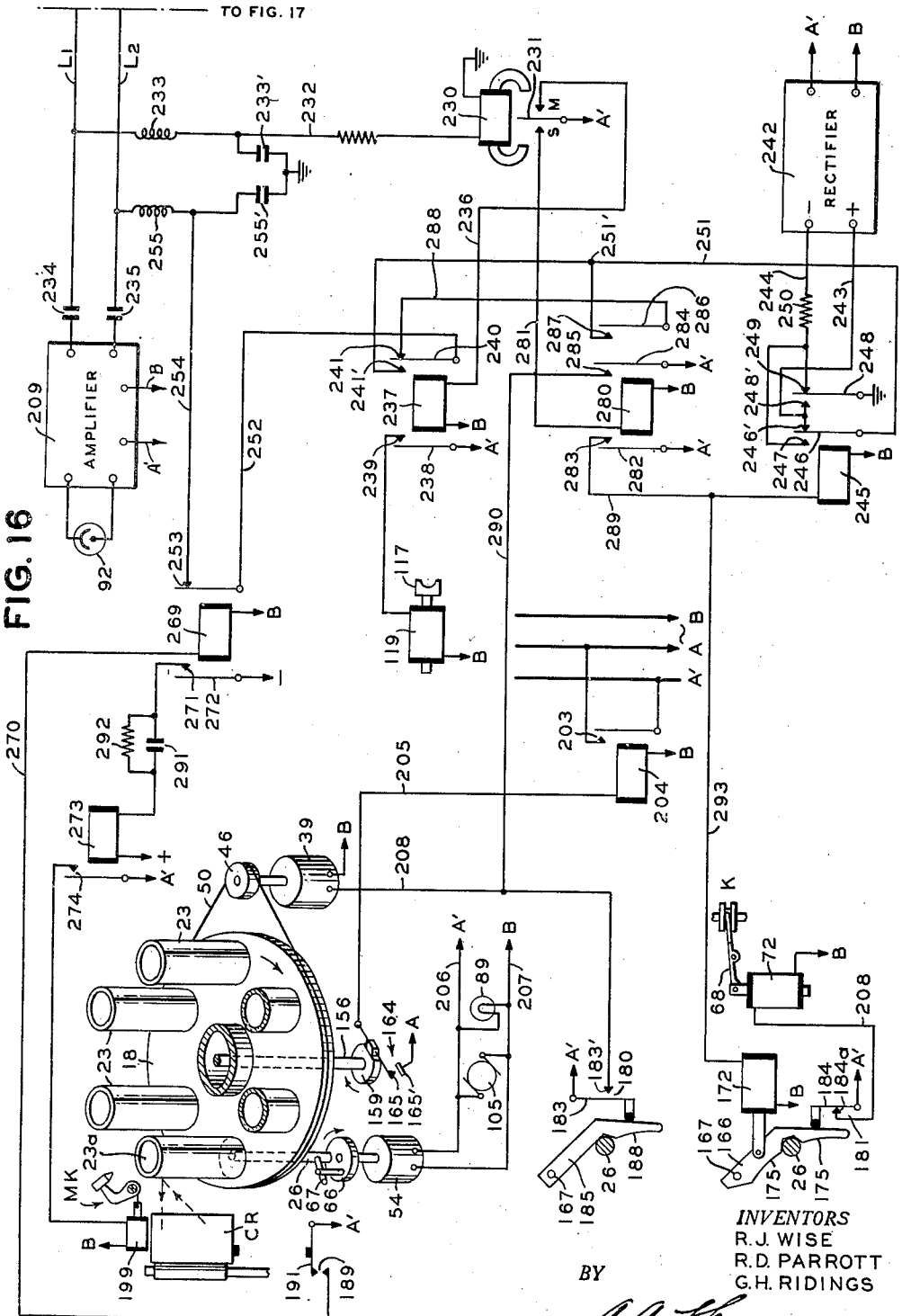
Figure 17:
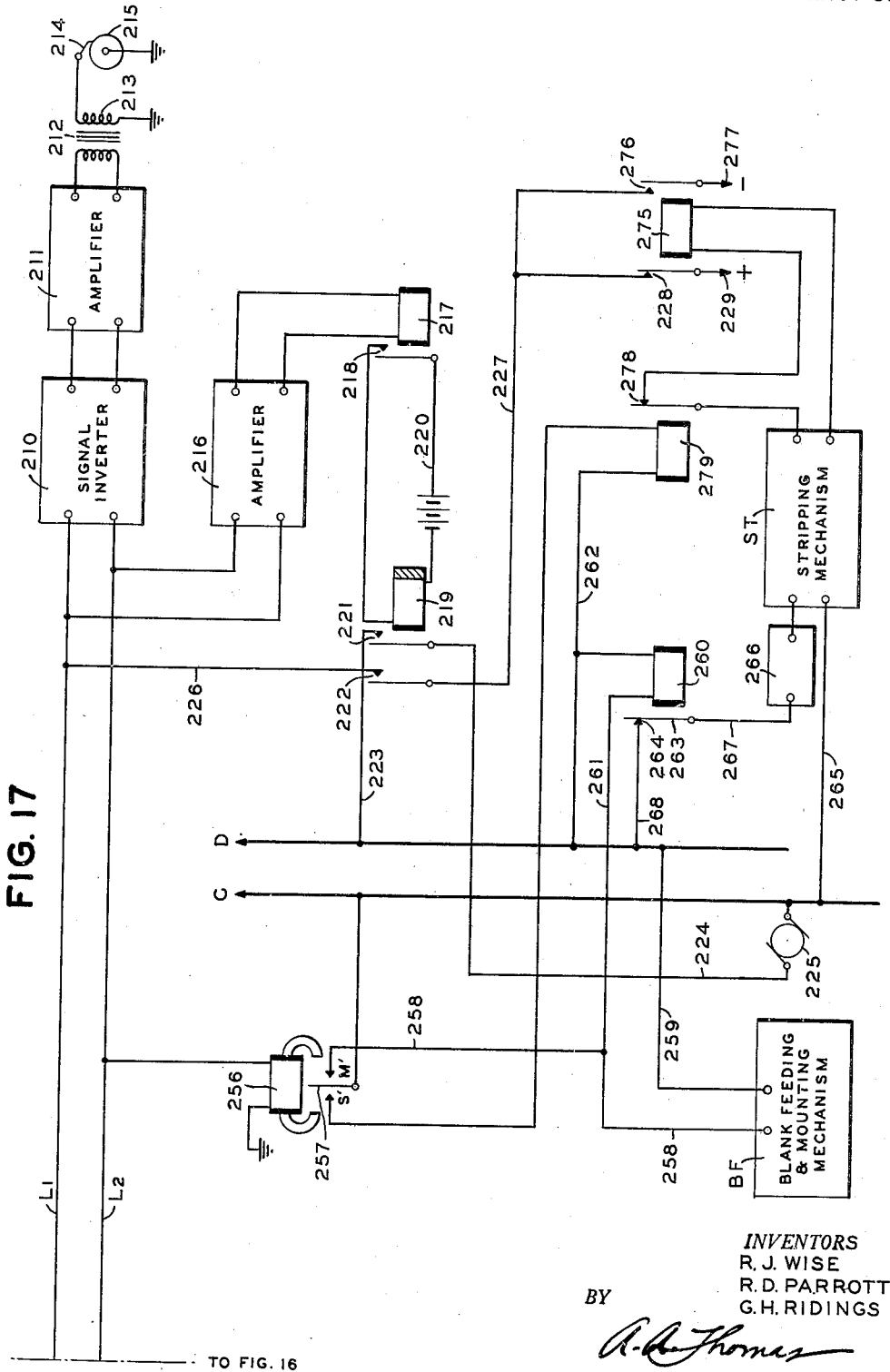
Figure 18:
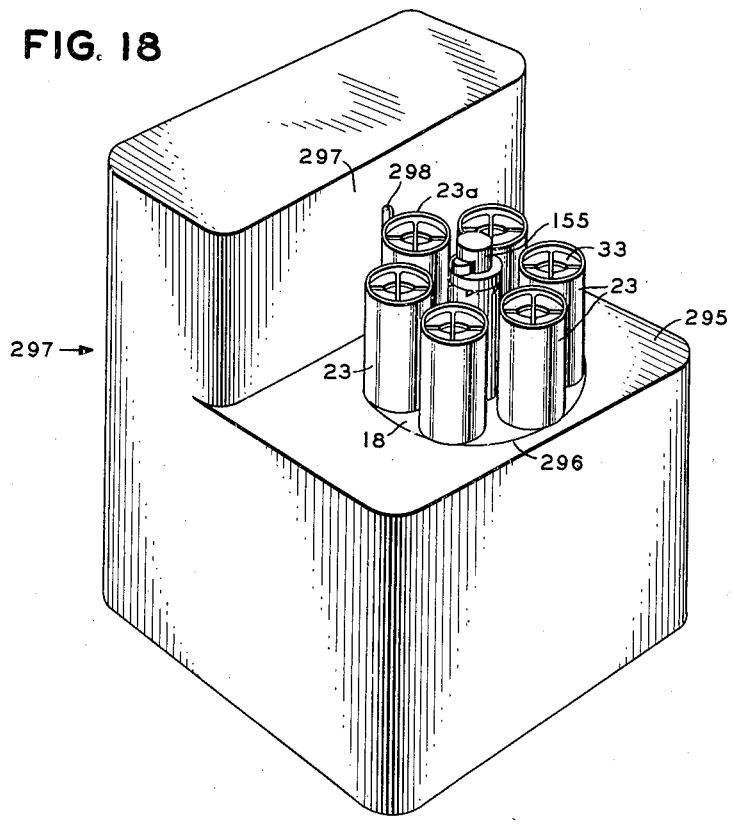
Figure 19:
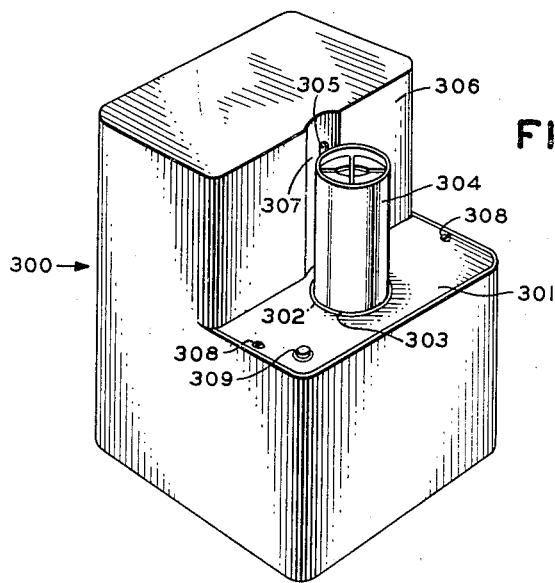

Fig. 16 is a diagram of the control circuits associated with the transmitter;

Fig. 17 is a diagram of the control circuits in a recorder connected with the transmitter;

Fig. 18 represents a perspective of our multicylinder machine with the outer case or cover in place;

Fig. 19 shows a one-cylinder transmitter embodying certain features of our invention;

Fig. 20 shows in plan view a scanning cylinder provided with sheet holding means operable by hand;

Fig. 21 is a vertical section on line 21—21 of Fig. 20;

Fig. 22 is a plan view of a cylinder provided with another form of manually operable sheet-holding means;

Fig. 23 is a vertical section on line 23—23 of Fig. 22; and

Fig. 24 shows a turntable carrying cylinders adapted to support copies on the outside instead of inside.

The turret mechanism

The apparatus embodied in our machine is supported on a heavy base 10 which may be an aluminum casting with a peripheral flange 12 to provide a shallow chamber 13 (Fig. 5) for accommodating some of the mechanism. The base casting 10 is formed with a raised portion 10a (Fig. 7) which is accurately machined for mounting various parts. A short hollow post or column 14, preferably cast integral with the base, carries a tube 15 which is forced at its lower end into the post where it rests on a shoulder 16. The united parts 14—15 constitute a mounting for rotary turret mechanism TM which is one of the main features of our invention.

Figure 5:
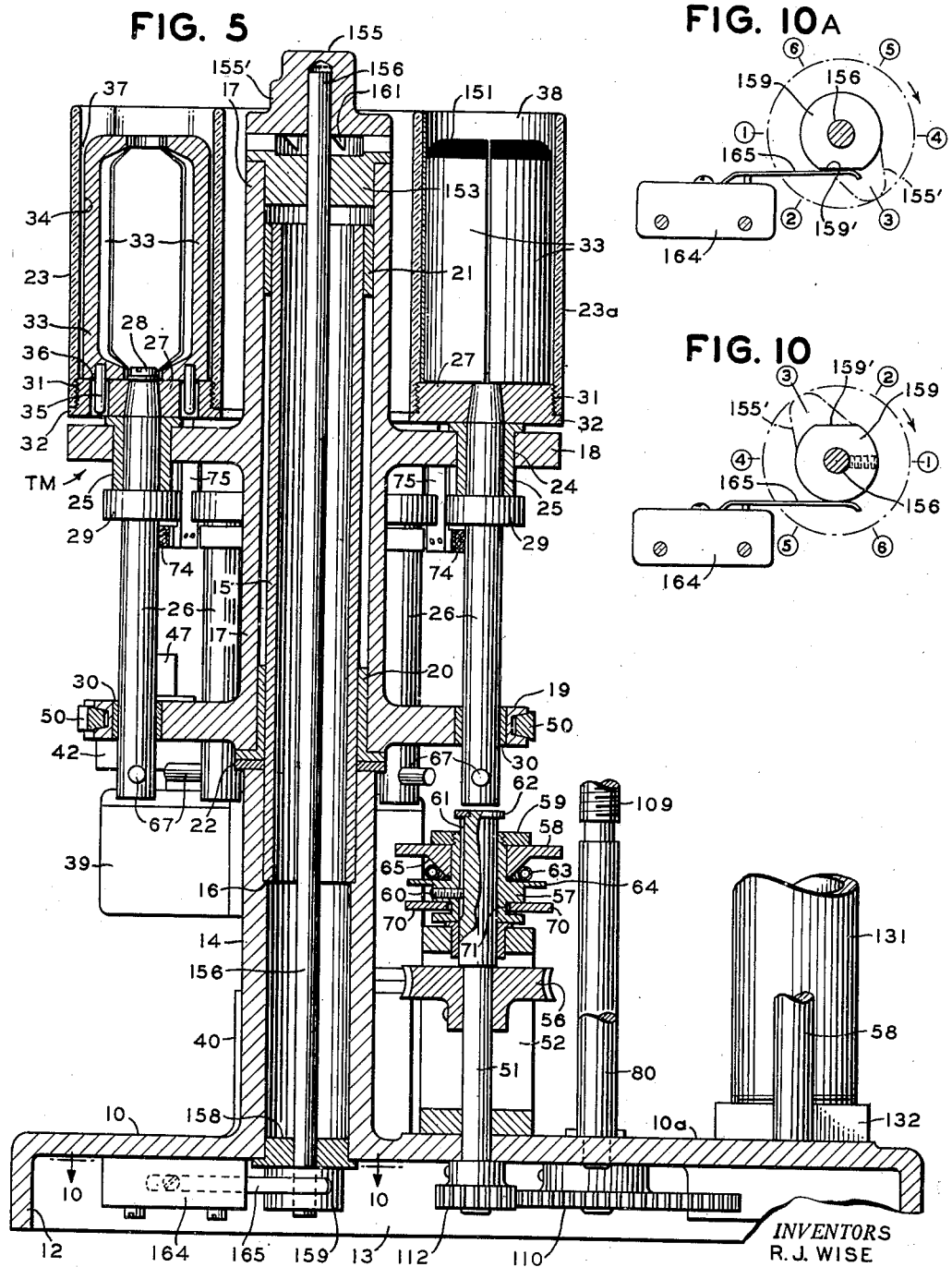
Fig. 5 is a vertical section on line 5—5 of Fig. 2.

As best shown in Fig. 5, the turret mechanism TM comprises a casting (usually aluminum) so shaped as to provide a tubular bearing or hub 17, an upper disk 18 and a lower disk 19. For distinction we shall refer to the upper disk 18 as a turntable and to the lower disk 19 as a driving pulley. A flanged bushing 20 is driven into the lower end of hub 17 and a ring 21 is fitted into the upper end of the hub to provide two spaced bearing points for the turret around the fixed tube 15. In this way the turret rotates easily and without vibration. If desired, a thrust washer 22 may be placed between the bushing 20 and the top of post 14 to reduce friction.

The turntable 18 carries a plurality of scanning cylinders 23 arranged at equal distances around the edge of the turntable. The present machine has six cylinders, but the number may obviously vary in accordance with the size and capacity of the machine. Each cylinder is mounted to rotate on the turntable independently of the others and since these mounting are alike it is only necessary to describe one of them. As shown in Fig. 5 the turntable 18 has a circular hole 24 for each cylinder and a bushing 25 is pressed into each hole for receiving a rotary shaft 26. The beveled upper end of this shaft carries a disk 27, preferably of bronze, which is secured by a screw 28. The disk 27 rests on the top flange of bushing 25, and a collar 29 fixed on the shaft 26 is in contact with the lower edge of the bushing, so that the shaft is held against axial displacement while being free to rotate. Each cylinder shaft 26 extends through a bushing 30 in the pulley 19 whereby the shaft has upper and lower bearings which provide a firm support for smooth operation.

The scanning cylinders 23 are mounted directly on the disks 27 and securely held thereon in any practical way. For short cylinders we prefer a screw-threaded connection as shown in Fig. 5 where the outer screw threads on disk 27 and the inner screw threads on cylinder 23 are shown in interlocking engagement at 31. The cylinder is screwed down until it strikes the bottom flange 32 of disk 27. The screw threads 31 are sufficiently fine to form a rigid connection for holding the cylinder in true vertical alignment. For mounting long cylinders on the disk 27 we provide the latter with a circumferential groove instead of screw threads and fill this groove with cement. The cylinder is then forced down over the disk and held in correct position until the cement has hardened.

In the machine we are describing the cylinders 23 are transparent for optical scanning of the inserted copies through the cylinder walls. Glass cylinders have heretofore been used for this purpose but we have found certain advantages in using cylinders of plastic transparent material, such as Lucite. This material is not only optically clear but can be cut and machined to produce cylinders of accurate dimensions. For example, a long piece of Lucite or similar tubing is cut into lengths representing each a cylinder, and if screw threads are required these can be cut accurately into one end of the cylinder inside or outside.

Figure 2:
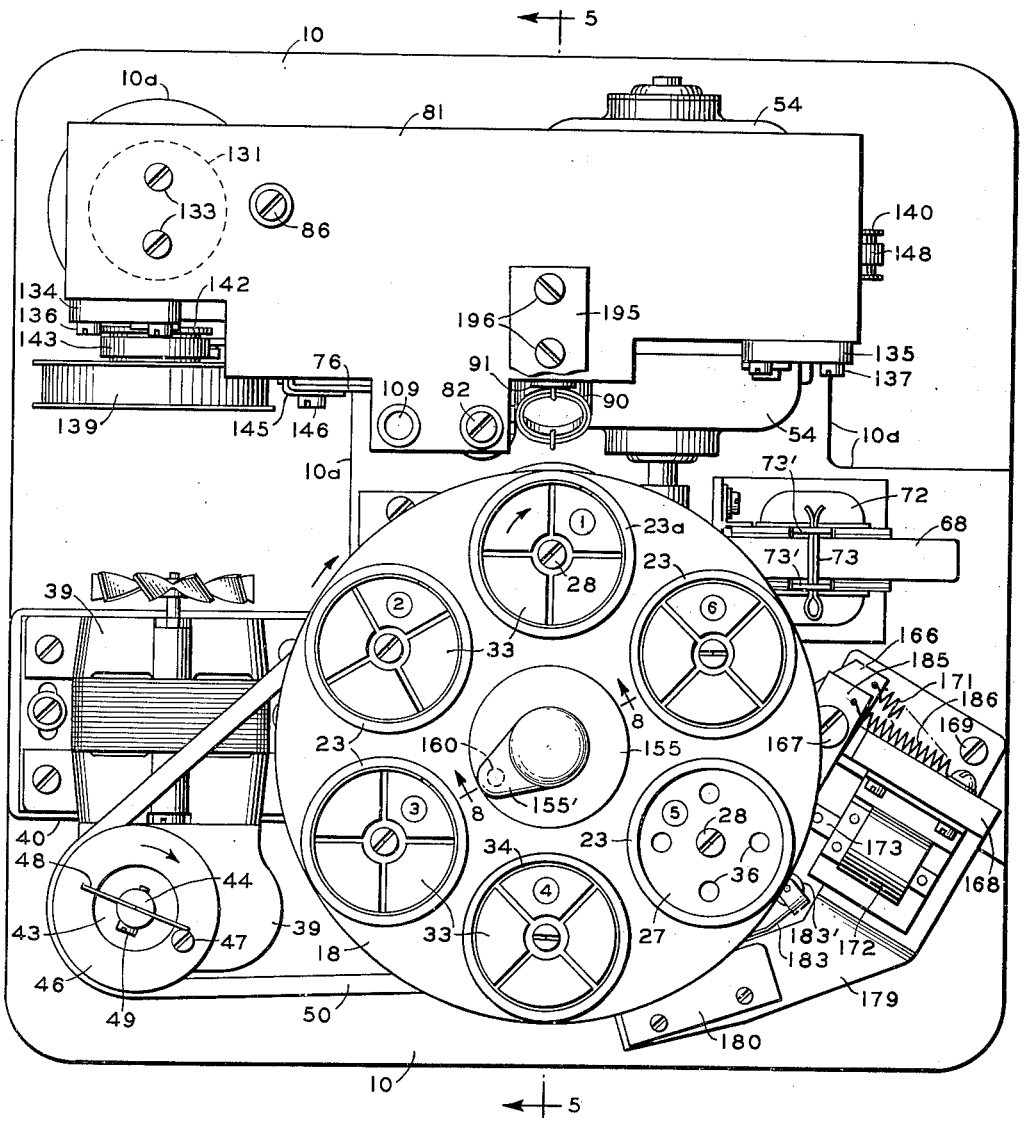
Fig. 2 is a plan view of the machine.
Figure 9:
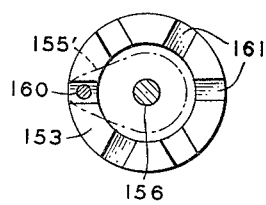
Fig. 9 is a section on line 9—9 of Fig. 8.

The copies to be scanned are inserted into the cylinders 23 by simply coiling them up with the subject matter outside and pushing them down with the palm until they rest on the base disks 27. The coiled up copy, whether a thin sheet or a card, will expand against the cylinder but it is necessary to hold it in firm uniform contact with the cylinder wall during the scanning operation when the cylinder is rotated rapidly. For this purpose we have provided novel copy holding means within the cylinder. Referring to Figs. 2 and 5, each cylinder contains four pieces 33 which constitute in effect an expansible cylinder with an outer cylindrical surface 34 concentric with the inner wall of the transparent cylinder. The members 33, which may be called cylindrical sectors, are heavy pieces of metal (such as brass) arranged to move radially outward by centrifugal force during rotation of the cylinder. Each sector has a pin 35 in the bottom projecting loosely into a hole 36 in disk 37, on which the sectors are supported for individual movement.

The weighted sectors 33 normally provide a narrow annular space 37 (Fig. 5) for receiving the inserted copy 38. The top edges of the sectors are beveled to facilitate the insertion of copy. When the loaded cylinder is rotated, as will be described later on, the sectors 33 automatically move outward and press the copy firmly against the adjacent wall of the cylinder. Since these sectors present a substantially unbroken cylindrical surface 34 against the paper, the latter is held with uniform pressure over its entire area against the rotating cylinder. The pins 35 have sufficient play in the holes 36 to allow the necessary movement of the centrifugal sectors. A scanned copy is easily removed by grasping it at the top where it extends above the sectors 33, as will be clear from Fig. 5. The sectors are simply dropped into the cylinder through the open top and require no further attention once they are in place.

The turret TM is rotated intermittently to bring the cylinders 23 into scanning position one after the other. In the present machine where there are six cylinders the turret is rotated through an arc of 60° to move the next cylinder into line for scanning. This operation of the turret is done by a small electric motor 39 mounted on a block 40 which may be cast integral with base 10. A vertical shaft 41 is connected to the motor shaft through a worm drive (not shown) and the upper end of shaft 41 carries a disk 42 which has a hub portion 43 and a pin 44. The parts 42—43—44 may be cast in one piece and this casting is secured to shaft 41 by a set screw 45 or otherwise. A grooved disk or small pulley 46 is loosely mounted on the hub 43 of disk 42 and carries a vertical pin 47 arranged to be engaged by a stiff leaf spring 48 which is attached at the center to pin 44. As shown in Figs. 2 and 7, the spring 48 passes through a slot in pin 44 and is secured in place by a screw 49.

Figure 1:
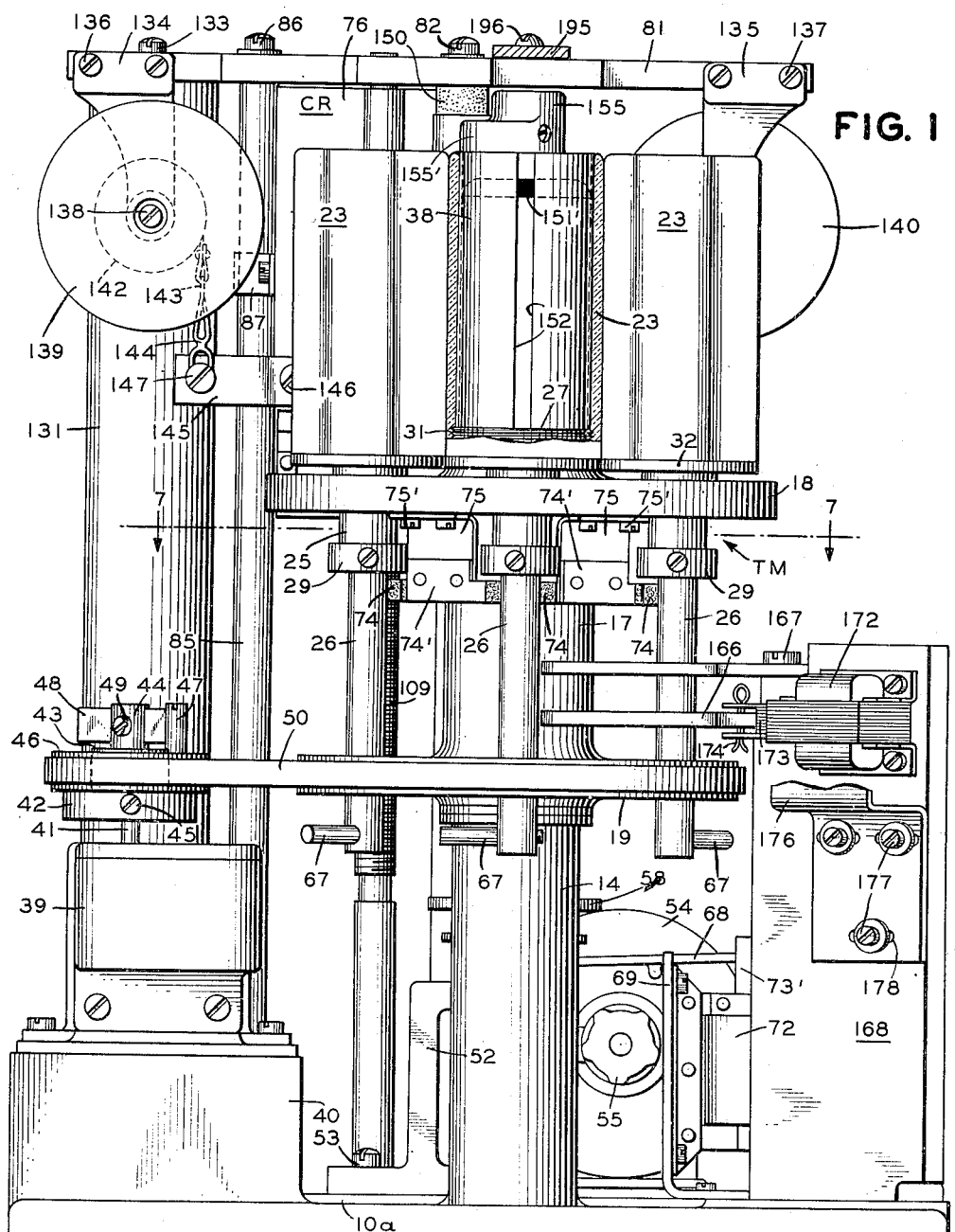
Fig. 1 represents a front elevation of a transmitter embodying our invention.

A driving belt 50 connects the grooved pulleys 19 and 46, which are in horizontal alignment as shown in Fig. 1. The motor 39 turns the spring arm 48 clockwise (as viewed in Fig. 2) and this arm engages the pin 47 to drive the turret pulley 46 in the same direction. As will be explained later, the turret is automatically locked in each operated position, and this means that the turret comes to an instantaneous stop. It is the function of spring 48 to act as a resilient driving connection between the motor 39 and the pulley 46 so as to relieve the motor of shock at the sudden stopping of the turret.

We shall now describe the mechanism for rotating the particular cylinder that is in scanning position. To distinguish this cylinder from the others we have marked it 23a in the drawings (Figs. 2 to 5). As previously explained, the vertical cylinder shafts 26 extend through and below the pulley 19. A driving shaft 51 projects upward from the base 10 in axial alignment with the shaft 26 of cylinder 23a but separated therefrom, as best shown in Fig. 5. The shaft 51 is mounted on a U-shaped bracket 52 which is secured to the base 10 by screws 53. A motor 54 mounted on the machined surface 10a of base 10 has a worm 55 in mesh with a worm gear 56 on shaft 51 whereby the latter is rotated at reduced speed.

On the upper portion of the cylinder driving shaft 51 is mounted an adjustable clutch unit K which comprises a sleeve 57, a friction disk 58 and a washer 59. The sleeve 57 is slidable on shaft 51 but is locked thereto for rotation by a set screw 60 in the sleeve engaging a key way 61 in the shaft. A washer 62 fixed to the top of the shaft 51 provides an annular stop for the upper movement of clutch sleeve 57, which normally rests on top of bracket 52 (Fig. 5). The friction disk 58 is loosely mounted on sleeve 57 so as to rotate thereon when necessary. The washer 59 is screwed to the upper end of sleeve 57 and cooperates with disk 58 to form a friction clutch under the pressure of a coil spring 63 which is seated in a groove formed by a flange 64 on sleeve 57 and the conical hub 65 of disk 58. As the spring 63 tends to contract, it pushes the disk 58 up against the washer 59 whereby these two parts constitute a frictional drive between the shaft 51 and the disk 58. A vertical pin 66 on disk 58 is arranged to engage a horizontal pin 67 on the lower end of each cylinder shaft 26 when the clutch unit K is in raised position.

Figures 6, 6A:
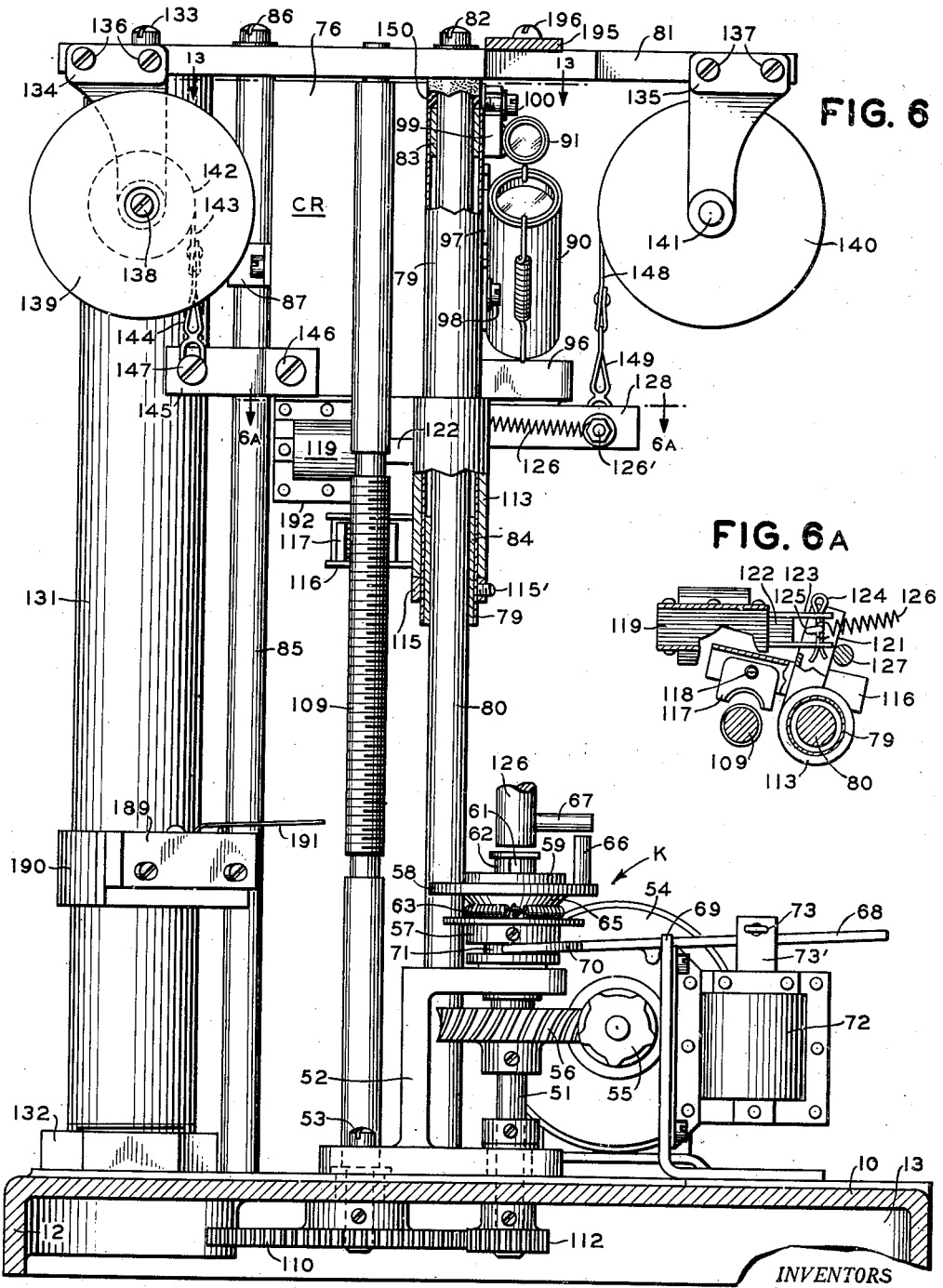
Fig. 6 is a vertical section on line 6—6 of Fig. 3.
Fig. 6A is a section on line 6A—6A of Fig. 6 showing certain details of the scanning mechanism.

The clutch unit K is operated by a lever 68 which is pivoted in a notch on top of a bracket 69 standing up from base 10. This lever has a forked end 70 engaging a groove 71 in sleeve 57, as shown in Figs. 5 and 6. The bracket 69 supports an electromagnet 72 which has a laminated plunger 72' for actuating the clutch lever 68. A convenient way to connect the plunger with the lever is to mount a pin 73 between a pair of projecting end plates 73' of the plunger. When the solenoid is energized, the plunger is pulled down and the cross pin 73 rocks the lever 68 to raise the rotating clutch K into operative position, whereby the pin 66 connects with the pin 67 on the aligned cylinder shaft 26. The cylinder 23a is now rotated at scanning speed (say 300 R. P. M.) until the inserted copy has been completely scanned and transmitted to the associated recorder.

When the solenoid 72 is deenergized, the heavy clutch drops by gravity to normal position where the driving pin 66 is out of the way of the connecting pins 67 on the cylinder shafts 26 so as not to interfere with the operation of the turret. The timing of solenoid 72 will be explained in connection with Fig. 16. To insure the instant stopping of cylinder 23a when the driving connection 66—67 is broken, we provide a brake 74 for each cylinder shaft 26. These brakes may be leather or rubber pads carried by spring arms 74' which are riveted to angle brackets 75. These brackets are fastened to the underside of turntable 18 by screws 75'. See Figs. 1, 2, 3, 4, and 7. The brakes 74 also act as a load on the cylinder shafts 26 and prevent chattering thereof.

*The scanning mechanism*

Figure 13:
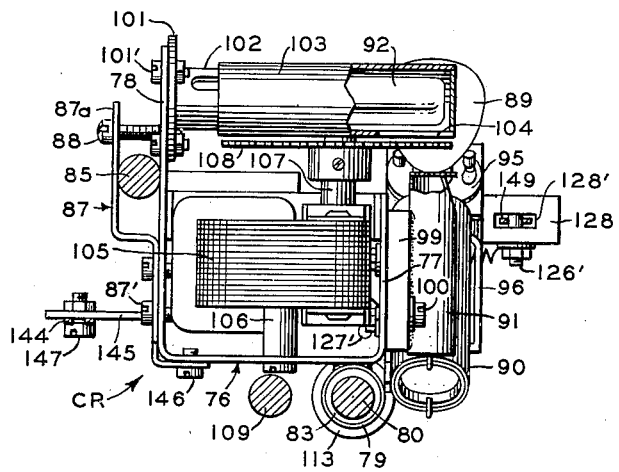
Fig. 13 is a section on line 13—13 of Fig. 6 showing a plan view of the scanning carriage.
Figure 14:
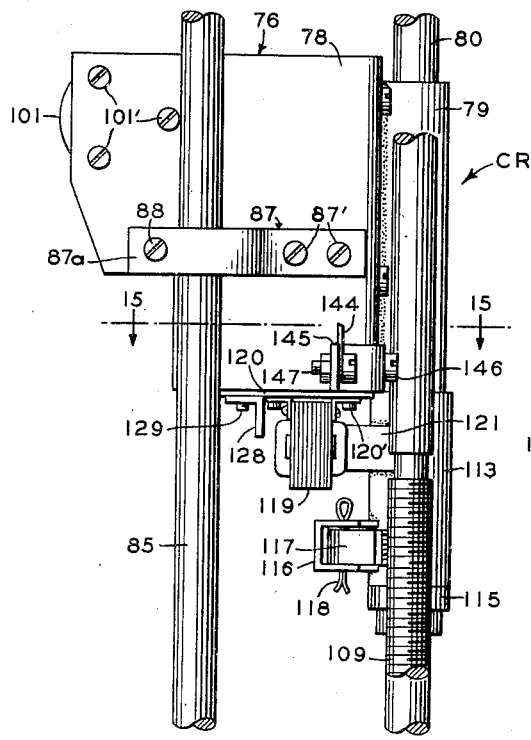
Fig. 14 is a side view of Fig. 13 looking from left to right.
Figure 15:
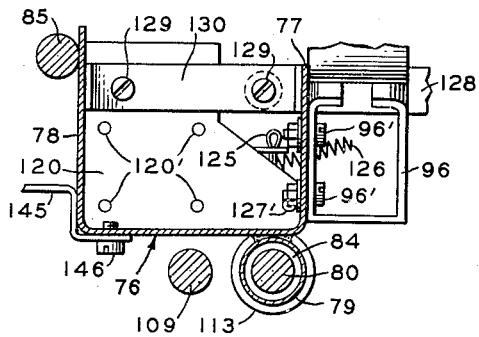
Fig. 15 is a section on line 15—15 of Fig. 14 but turned so as to correspond in position with Fig. 13.

A single scanning device does for all the cylinders, which are brought into scanning position one at a time. Viewing the machine from the front, the cylinder in scanning position is the one at the rear marked 23a (Fig. 2). The optical parts of the scanning mechanism are mounted on a vertically movable carriage CR of novel construction, as best shown in Figs. 13 to 15. A U-shaped plate 76 of sheet metal has rearwardly extending sides 77 and 78. A tube 79 is soldered or otherwise attached to the front of plate 76 and this tube is slidably mounted on a stationary post or rod 80 which extends between the base 10 and a top plate 81 to which the rod is fastened by a screw 82. To reduce friction and produce a smooth easy movement of tube 79 on rod 80, the tube is furnished with an upper bushing 83 and a lower bushing 84 (preferably bronze) which act as bearings for the tube, as shown in Fig. 6.

The carriage CR is prevented from turning on rod 80 by connecting it to a guide rod or post 85 fixed between the base 10 and the top plate 81 to which the rod is secured by a screw 86. A bracket 87 fastened to the side 78 of plate 76 by screws 87' extends around the rod 85, and a screw 88 connects the outer end of the bracket to the plate. It is clear from Figs. 4 and 13 that the spring arm 87a of bracket 87 is adjustable to correct position with respect to the guide rod 85 by simply turning the screw 88 so as to obtain a close sliding fit between the carriage and the guide rod. This prevents twisting or turning of the carriage without interfering with its vertical sliding movements.

The U-shaped plate 76 carries the optical parts of the scanning mechanism comprising an exciter lamp 89, a projection tube 90, a pickup tube 91, and a photocell 92. It will not be necessary to describe these parts in detail because their construction is well known. We need only say that the light from lamp 89 passes through the lenses of the tube 90 to form a scanning spot on the copy in cylinder 23a and from there the light is reflected through the lens assembly in pickup tube 91 to the sensitive cathode of photocell 92. The path of the light beam is indicated by the dash-dot lines 93—94 in Fig. 3.

The exciter lamp 89 is mounted on a suitable base 95 arranged at the proper angle and secured to a U-shaped bracket 96 extending from the side wall 77 of the U plate 76. The bracket 96 is fixed to the plate 77 by screws 96' (Fig. 15). The projection tube 90 is attached to the side wall 77 by a slotted plate 97 (Fig. 3) which is clamped in adjusted position by a pair of screws 98 passing through slots 97' in the plate. This adjustment of tube 90 is in an axial direction to focus the light on the copy to be scanned. The pickup tube 91 is similarly mounted on the side wall 77 in adjustable position by means of a slotted plate 99 and one or two screws 100. The photocell 92 is mounted on a suitable base 101 which is attached to the left side 78 of U plate 76 by screws 101'. The base 101 has a tubular extension 102 for mounting the photocell. A lightproof cap or cover 103 slipped over the extension 102 completely encloses the photocell except for a slit 104 to admit the scanning beam.

A small electric motor 105 is mounted in the rectangular chamber of U plate 76 and is secured by studs 106 to the front wall of the plate, as shown in Fig. 13. The rear end of motor shaft 107 carries a slotted disk 108 for interrupting or chopping the light beam as it passes from the pickup tube 91 to the photocell 92. The disk 108 turns at a definite speed to produce a carrier current of prescribed frequency, as will be understood without further explanation.

The slow downward movement of scanning carriage CR is effected by a vertical screw shaft 109 which is journaled in the base plate 10 and the top plate 81. As shown in Fig. 5, the lower end of shaft 109 extends into the base chamber 13 and carries a gear 110 which is in mesh with a pinion 112 fixed on the lower end of drive shaft 51. The screw shaft 109 is thus driven continuously at the proper speed. The carriage CR is normally disconnected from the screw shaft 109 and is connected thereto by a device which we shall now describe.

A sleeve 113 is rotatively mounted on the tube 79 of carriage CR and is held against sliding movement by the lower edge 114 of U plate 76 (Fig. 3) and by a collar 115 secured to the tube by screws 115'. The sleeve 113 carries a channel bar or bracket 116 (Figs. 3 and 14) which may be soldered in place, and a half nut 117 is pivotally mounted between the flanges of the bracket by means of a pin 118, as shown in Fig. 6A. When the bracket 116 is rocked counterclockwise, the half nut 117 engages the screw shaft 109 whereby the carriage CR is connected for downward scanning movement.

The half-nut bracket 116 is operated by an electromagnet or solenoid 119 which is secured to the bottom of the U plate 76 by a cross plate 120 soldered to the bottom edges of side walls 77 and 78. Four screws 120' connect the solenoid to plate 120. A channel arm 121 is suitably attached to the sleeve 113, as by soldering, this arm being above the bracket 116 and extending at right angles thereto. The plunger 122 of electromagnet 119 has a pair of extensions 123 which carry a horizontal pin 124 arranged to engage a vertical pin 125 on the outer end of channel arm 121. When the solenoid 119 is energized, the plunger 122 is pulled in and the pin 124 rocks the bracket 116 to connect the half nut 117 with the rotating screw shaft 109. The pivotal mounting of the half nut on pin 118 allows it to adjust itself fully to the screw threads on the shaft.

When the solenoid 119 is deenergized, a contracting coil spring 126 pulls the parts back to normal position, as shown in Fig. 6A. A pin 127 (Fig. 3) depending from a corner of the bottom plate 120 is in the path of channel arm 121 and forms a stop to limit the return movement of the parts. One end of spring 126 is attached to the pin 125 and the other end is fastened to a screw 126' on an angle bar 128 which projects laterally from the bottom of U plate 76. The angle bar 128 is secured by screws 129 to a cross strip 130 which is soldered to the sides 77—78 over the cross plate 120, as shown in Fig. 15.

We have explained how the scanning carriage CR is moved down by the screw shaft 109 during the scanning operation. Now we shall describe how the carriage is automatically returned to normal position when the half nut 117 is released from the screw shaft. The top plate 81 is firmly supported on an iron pipe or post 131 which is screwed to the base plate 10 and locked by a nut 132. As shown in Fig. 7, the post 131 is at the left rear corner of the base and the plate 81 is secured to the top of the post by screws 133 (Fig. 2). A pair of depending brackets 134 and 135 are fastened to the opposite ends of plate 81 by screws 136 and 137 respectively.

The left bracket 134 carries a stud 138 on which a rotary spring drum 139 is mounted and a second spring drum 140 is mounted on a stud 141 carried by the other bracket 135. The engineers refer to these spring drums as recoils. There is no need to show or describe the structural details of the spring drums because they are well known return devices used on various machines. However, while such spring drums are old in themselves, we have incorporated these elements in a novel combination to produce a scanning mechanism of new construction. In the particular design of the machine illustrated, the spring drum 139 is positioned in front of bracket 134 and the other drum is arranged behind the bracket 135, so that the recoils are not in transverse alignment with respect to the scanning carriage CR, as best seen in Fig. 2.

The left recoil 139 carries a small pulley 142 which rotates with the recoil on shaft 138 to which one end of the flat spiral spring inside the recoil is connected. A tape or narrow belt 143 is wound on the pulley 142 and connected thereto at its inner end, while the outer end 144 of the tape is connected to an arm 145 secured by a screw 146 to a corner of the U plate 76 (Fig. 6). The outer end 144 of tape 143 may be in the form of a metal loop fastened to the arm 145 by a screw 147. A similar tape 148 is connected to and wound over the drum 140, and a metal loop 149 at the outer end of the tape is connected by the screw 126' to the angle bar 128 (Figs. 3 and 6). The lower portion of loop 149 passes through a slot 128' in the angle bar, as shown in Fig. 13.

It is clear then that the recoils 139 and 140 are connected to opposite sides of the scanning carriage CR at the points 147 and 127, respectively. As the carriage moves down when the half nut 117 engages the screw shaft 109, the flat spiral springs in the drums 139 and 140 are wound up until the carriage reaches the end of its downward travel. The moment that the carriage is released from the screw shaft 109 by the deenergizing of magnet 119, the tension springs in the recoils pull the carriage instantly back to normal position. There is a rubber cushion 150 at the top of rod 80 to form a silent stop for the return of the carriage which is firmly held in its normal raised position by the spring drums.

In the machine shown in the drawings the shaft 138 of drum 139 is nearer to the center of gravity of the scanning carriage CR than is the shaft 141 of drum 140. Therefore, to equalize the upward pull of the recoils the tape 143 of drum 139 is wound on the pulley 142 of reduced diameter in order to increase the torque of the spring. In other words, if we regard each drum as acting through an imaginary lever arm extending from the center of the drum to a vertical line passing through the center of gravity of carriage CR, it will be seen that the drum 139 acts through a shorter arm and therefore must have more lifting power than the drum 140. As the carriage moves down, the spring in drum 139 is wound up at a faster rate than the spring in drum 140, whereby the lifting power of the two recoils is equalized and the carriage moves smoothly up and down.

The operation of the optical scanning mechanism will be understood without further description. It is only necessary to say that as the cylinder 23a rotates rapidly, the light spot focused on the copy moves slowly downward and the light variations thus produced cause the photocell 92 to generate a carrier frequency which is modulated in accordance with tone values of the transmitted copy. We usually operate the scanning cylinder at 300 R. P. M. and the scanning speed of the carriage is such that the copy is scanned at 100 lines per inch for the best results.

We utilize the copy-holding members 33 to generate a phasing signal for the recorder. The tops of these members are painted black to form a circular black band 151 as shown in Figs. 1 and 5. The inserted copy 38 leaves a gap 152 lengthwise of the cylinder and this gap exposes a rectangular portion 151' of the blank band 151 to the scanning beam, no matter where the gap occurs. The rest of the cylindrical sectors 33 is white like the copy and scans like a blank surface. Placing the mark 151' on the inner cylinder 33 obviates the necessity of printing it on the copy itself, as done heretofore, so that no specially prepared copy is required. Since the operation of phasing marks in facsimile systems is well known, we need not show or describe any circuits controlled by the phasing band 151.

*Switch controls in the transmitter*

The transmitter contains a number of switches for controlling various electrical parts and we shall now describe how the switches are operated. The top of the tubular extension 17 of turret TM carries a plug 153 which is fixed in place by a set screw 154. A rotary cap 155 is fitted on plug 153 (Figs. 5 and 8) and is formed with an integral radial projection 155' which acts as a pointer or indicator. The cap 155 is fastened to the top of a rod 156 by a set screw 157 or otherwise. The rod 156 passes with a tight fit through a hole in plug 153 and the lower end of the rod turns snugly in a bushing 158 at the bottom of the hollow post 14. A cam disk 159 is fixed on the lower end of rod 156 in rubbing contact with the bushing 158 which cooperates with the plug 153 to hold the rod against axial displacement. The disk 159 is cut away at the periphery to provide a straight edge 159'.

Figure 8:
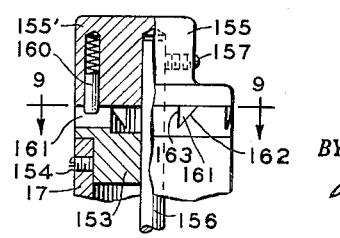
Fig. 8 (sheet 2) shows a switch operating detail on section line 8—8 of Fig. 2.
Figure 4:
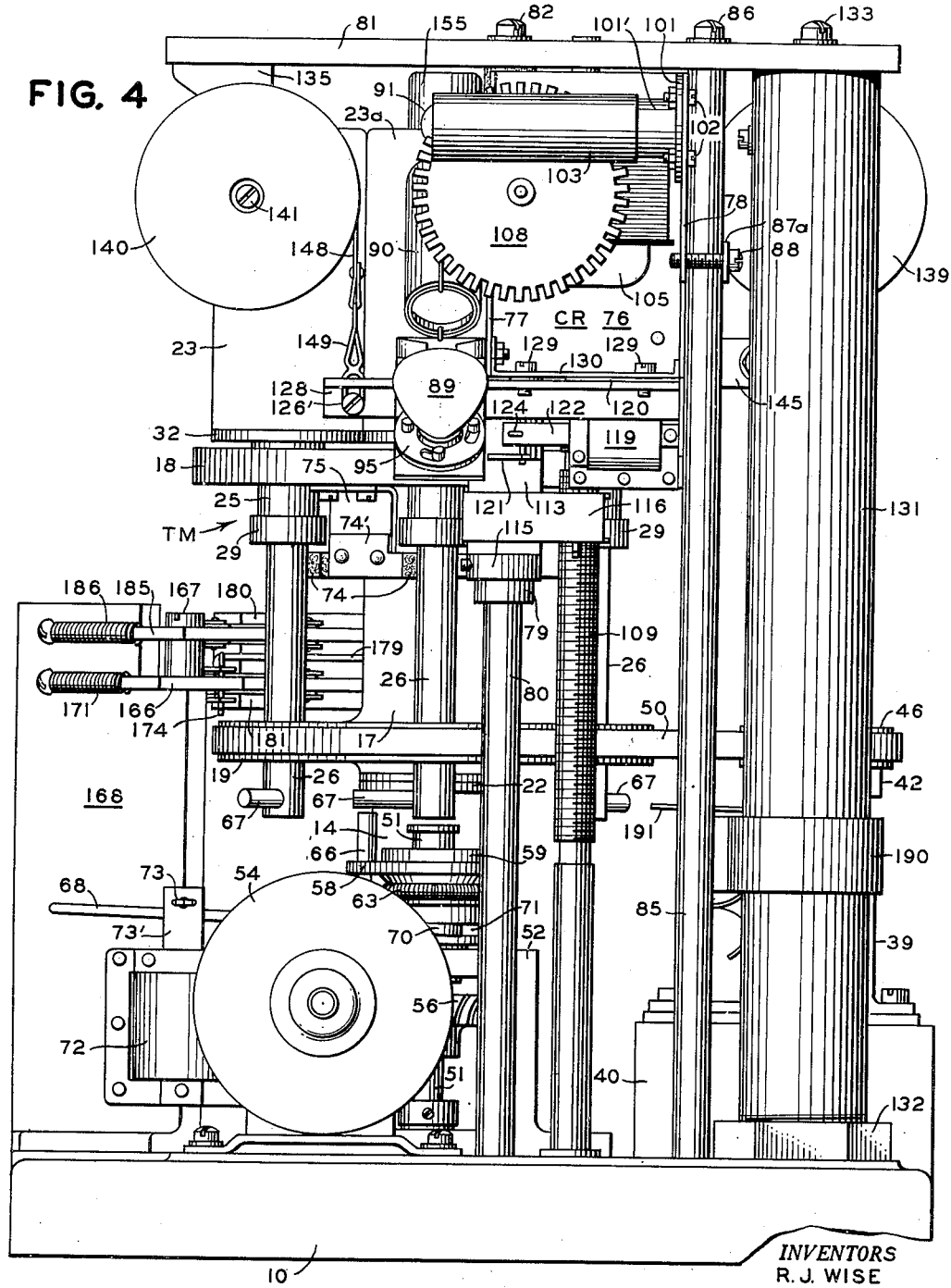
Fig. 4 is a rear view of the transmitter.

The cap 155 carries a spring-pressed pin 160 arranged to engage notches 161 in the top edge of plug 153. As shown in Fig. 8, the notches 161 have a slanting cam surface 162 and a vertical locking shoulder 163. Consequently the cap 155, which acts as a finger piece, can be turned leftwise by hand, for the pin 160 rides over the cam surfaces 162. There are as many notches 161 as there are cylinders on the turntable 18 and these notches are arranged in radial alignment with the cylinders. Whenever the pin 160 snaps into a notch 161, the indicator 155' points to one of the cylinders 23, as shown in Fig. 2. In other words the finger piece 155 can be turned counterclockwise to select any particular cylinder for a purpose to be presently explained. When the turntable 18 is rotated clockwise by the motor 39, as previously described, the cap 155 and rod 156 turn with it due to the frictional contact of those parts with the plug 153.

The cam disk 159, which turns with the rod 156, operates a switch 164 of any practical type, such as a microswitch of well known construction which need not be described. This switch has an operating arm 165 extending outside the casing. The free end of this arm is in pressure contact with the edge of disk 159. As long as the arm 165 engages the circular edge of the disk (Fig. 10) the switch 164 remains closed, but when the arm 165 engages the straight edge 159' of the cam disk (Fig. 10A) this arm moves outward and opens the switch. At this point we need only say that when the switch 164 is closed, the transmitter is connected to its source of power and the opening of the switch cuts off the electric power from the machine, which thereupon stops. How that is done will be fully explained in connection with the circuits of Fig. 16.

The switch 164 may therefore be regarded as the start and stop switch of the transmitter and is controlled by the hand knob 155 which not only starts the machine but determines when the machine shall stop. To understand this fully, let us look at Figs. 2, 10 and 10A. For the sake of explanation we shall assume that the attendant has only three messages to transmit, which he loads into the first three cylinders marked No. 1, 2 and 3. He turns the switch knob 155 until the pointer 155' indicates cylinder No. 3, the last one that is to be scanned. The disk 159 is now in the position shown in Fig. 10 where cylinder No. 1 is in scanning position and the switch 164 is closed. The machine is now running to scan and transmit the copy in the first cylinder.

After the scanning of cylinder No. 1, cylinders No. 2 and No. 3 are successively brought into scanning position by the timed operation of turntable 18. After cylinder No. 3 has been scanned, the switch 164 is still closed and the first empty cylinder No. 4 is moved into scanning position. When that happens the disk 159 is in such angular position that the switch arm 165 engages the straight edge 159' of the disk and the switch 164 snaps open. The machine, therefore, stops automatically after scanning of the last loaded cylinder as determined by the position of the indicator knob 155.

If all six cylinders are loaded, the attendant moves the pointer 155' to cylinder No. 6 so that all the cylinders will be scanned in automatic sequence. The cylinders can be kept loaded by replacing scanned copies with fresh ones and adjusting the switch knob 155 to indicate the last loaded cylinder. In this way the machine can be kept going to transmit an indefinite number of copies without interruption. To stop the machine at any time it is only necessary to turn the knob 155 until the switch 164 is opened by the cam disk 159.

Referring to Fig. 7, the turret mechanism is locked in scanning position for each cylinder by a dog or latch 166 mounted on a pivot 167 which is a vertical stud projecting from a post 168 secured to base 10 by screws 169. The latch 166 has a notch 170 shaped to receive the cylinder shafts 26. The location of notch 170 is such that when a cylinder is in scanning position the notch engages one of the shafts 26 and locks the turret TM against rotary movement. A contracting coil spring 171 attached to the rear end of latch 166 and to the post 168 holds the latch locked to the engaged shaft 26.

The latch 166 is operated to releasing position by a solenoid 172 which has a plunger 173 connected to the latch by a pin 174. When the solenoid is energized, as will be explained in Fig. 16, the plunger 173 is pulled in and the latch 166 is rocked away from the turret, thereby withdrawing the notch 170 from the shaft 26. The turret is now rotated to bring the next cylinder into scanning position. The solenoid 172 is deenergized after the shaft 26 has moved clear of the notch 170. As the turret continues to turn, the next shaft 26 rides over the curved edge 175 of the latch until it encounters the notch 170, whereupon the turret is locked for the next scanning operation.

The upright post or stand 168 carries a bracket 176 secured by screws 177 which pass through horizontal slots 178 in the bracket to permit lateral adjustment thereof. The bracket 176 has an arm 179 (Figs. 2 and 3) which carries a pair of switches 180 and 181 secured to opposite sides of the arm by screws 182. These two switches, like the switch 164, may be of the so-called microswitch type which are so well known as to require no description. It is enough to say that the upper switch 180 has an operating arm 183 and the lower switch 181 has a similar arm 184. The switch 180 is normally open and is closed when the arm 183 is moved toward the switch box. The switch 181 is normally closed and is opened by the arm 184 being moved toward the switch box.

The switch arm 183 has a roller 183' arranged to be engaged by a lever 185 pivoted on the stud 167 above the latch 166. The lever 185 is normally urged toward the turret by a coil spring 186 connected to the rear of the lever and to the post 168, as shown in Fig. 7. The rear edge of lever 185 has a recess 187 and a curved end portion 188. When the turret is locked in any one of its scanning positions, one of the cylinder shafts 26 rests in the recess 187 and the associated switch 183 is not engaged by the lever 185. However, when the turret is turned clockwise, the shaft 26 moves out of recess 187 and rides over the curved surface 188, thereby actuating the switch arm 183 to closing position. In other words, the switch 180 is held closed as long as the shaft 26 engages the curved edge 188 of lever 185. The function of switch 180 will be explained in connection with Fig. 16.

The switch arm 184 has a roller 184' at its free end arranged to be engaged by the latch 166 when the latter is operated by the electromagnet 172 to release the turntable, as previously explained.

As long as the notch 170 of latch 166 engages a cylinder shaft 26, the switch arm 184 is clear of the latch and the switch 181 remains in normal closed position. However, when the latch 166 is moved outward into releasing position by the solenoid 172, the latch operates the arm 184 to open the switch 181. This switch remains open as long as the shaft 26 rides over the curved edge 175 of latch 166. The moment that the moving shaft 26 encounters the notch 170, the spring 171 rocks the latch rearward (that is, toward the turret) and the switch 181 is again closed. The purpose of this switch will be explained in the description of Fig. 16.

A normally open microswitch 189 is mounted on the pipe 131 (Fig. 6) by means of a band 190. This switch has an operating arm 191 arranged in the path of the scanning carriage CR. In the present design of the transmitter, the bottom 192 of solenoid 119 strikes the arm 191 to close the switch when the carriage is at the end of its downward movement. The closing of switch 189 automatically disconnects the half nut 117 from the screw shaft 109 so that the carriage CR is free to be returned to normal position by the spring drums 139 and 140. The circuit connections controlled by switch 189 will be described in Fig. 16.

The switch 189 also controls a marking device MK (Figs. 11 and 12) for automatically marking a scanned copy before its removal from the cylinder. This marker comprises an arm 193 pivoted on a stud 194 which is carried by a bracket 195. This bracket is fastened to the top plate 81 by screws 196. The free end of arm 193 carries a suitable marking point 197. A coil spring 198 on stud 194 normally holds the arm 193 in raised position, as shown in Fig. 11. The solenoid 199 attached to the underside of plate 81 has a plunger 200 connected by a thread or thin wire 201 to a small pulley 202 rotatable on the stud 194. The pulley 202 is attached to the arm 193 in any practical way and acts as a bearing for the arm. When the solenoid 199 is energized and pulls its plunger in, the pulley 202 is rotated to swing the arm 193 into marking position, as indicated by the dotted lines 193'. The point 197 places a suitable mark on the scanned copy 38 in cylinder 23a before the turntable is moved to the next scanning position.

*Control circuits of transmitter and recorder (Figs. 16 and 17)*

The source of power for the transmitter is represented in Fig. 16 by a pair of bus bars A and B. An auxiliary bus bar A' is connected to bus bar A through a switch 203 operated by a relay 204. The switch 203 is normally open and is closed only when the relay is energized. To simplify the circuits in Fig. 16 we have indicated the connection of a terminal or conductor with the bus bars A, B and A' by using arrows marked with those letters. It will be understood that any device connected to conductors A' and B is not included in the power circuit unless the relay switch 203 is closed. In describing the circuits we use the term wire to indicate any kind of electrical connection.

One side of relay 204 goes to the power main B and the other side is connected by a wire 205 to the arm 165 of switch 164. In the mechanical structure of switch 164, the arm 165 is an operating member for the contact parts inside the switch box, but for convenience we have used the arm 165 in Fig. 16 as a movable contact adapted to engage a fixed contact 165' which is connected to bus bar A. Therefore, when the attendant turns the knob 155 to close the switch 164, relay 204 is energized to connect the auxiliary bus bar A' to bus bar A.

The closing of relay switch 203 closes the circuit of scanning motor 54 which is connected by lines 206 and 207 to bus bars A' and B. The exciter lamp 89 and chopper motor 105 are connected across the lines 206—207. Therefore, when the starting switch 164 is closed, the optical scanning mechanism is energized, but the carriage CR is not yet moving. At the same time, since the switch 181 is closed, the clutch magnet 72 is energized to raise the clutch K into connecting position whereby the motor 54 rotates the particular cylinder that happens to be in position for scanning. It will be clear that the motors 54 and 105 and the exciter lamp 89 are energized continuously as long as the relay switch 203 is closed.

To simplify the switch connections for clutch magnet 72 we have assumed the arm 184 to be a movable contact member normally closed against a fixed contact 184a which is connected to one side of the magnet. The other terminal of this magnet goes to bus bar B and the movable contact 184 is connected to bus bar A' so that the clutch magnet 72 remains energized as long as the switch contacts 184—184a are closed. This occurs during the scanning of each cylinder while the turret is locked by the latch 166. When the magnet 72 is deenergized at the end of a scanning operation (as will presently be explained) the clutch K instantly drops to releasing position to permit operation of the turret.

The motor 39, which operates the turret (represented in Fig. 16 by the turntable 18) has one terminal connected to bus bar B and the other terminal to a wire 208 which goes to the fixed contact 183' of switch 180. The arm 183, previously described as an operating member outside the switch box, is used here as a movable contact connected to bus bar A' and operated by the lever 185 to close the switch 180 for energizing the turret motor 39. The driving belt 50 is shown connected to the turntable 18 to simplify the drawing.

To understand the operation of the other circuits and control devices in the transmitter, it is necessary to see what happens at the recorder during the scanning operation. The modulated carrier or signal frequency generated by the photocell 92 passes through an amplifier 209 which is connected by a pair of transmission lines L1 and L2 with a recorder illustrated diagrammatically in Fig. 17. The amplifier 209 is connected to the power lines A' and B when the relay 204 is energized upon operation of the starting switch 164. We might say here that Fig. 17 is in certain respects a simplified form of Fig. 14 of Ridings and Wise Patent No. 2,386,263, issued October 9, 1945, except that this patent contains no provisions for controlling a multi-cylinder transmitter.

The modulated signal frequency or carrier tone received by the recorder of Fig. 17 passes through a signal inverter 210, then through an amplifier 211, the output of which is connected to a transformer 212. The secondary coil 213 of this transformer is in the circuit of a stylus 214 which acts on electrical recording paper mounted on the scanning cylinder 215. This arrangement is well known in the facsimile art and requires no further description. It will be understood that the electric impulses in the recorder circuit cause the stylus 214 to mark the recording paper so as to produce an exact duplicate or facsimile of the transmitted copy.

An amplifier 216 at the recorder is connected to lines L1 and L2 and the amplified output of this amplifier energizes a line relay 217 to close a switch 218 and thereby energize a slow-acting relay 219. This relay remains energized as long as signal current flows through relay 217, that is, during the scanning of copy at the transmitter. The vibratory movements of switch 218 due to the alternating current that flows through relay 217 have no effect on relay 219 which remains energized during the brief open intervals of switch 218. For convenience we have shown a simple battery circuit 220 for relay 219.

The energization of relay 219 closes the associated make contacts 221 and 222. The fixed member of the pair of contacts 221 is connected by a wire 223 to the bus bar D and the movable member is connected by a wire 224 to one terminal of a motor 225 which operates the recording cylinder 215. The other terminal of motor 225 is connected to bus bar C. It will be understood that the bus bars C—D represent any suitable source of electric power for the recorder. The other switch 222 controlled by the relay 219 has its fixed contact connected by a wire 226 to transmission line L1 and its movable contact is connected by a wire 227 to the fixed contact of a normally closed switch 228. The movable contact of this switch is connected to a suitable source of positive direct current potential indicated by the arrow 229.

We have now described enough of Fig. 17 to understand what happens at the recorder when the starting switch 164 at the transmitter is closed by the operation of knob 155. Assuming a loaded cylinder to be in scanning position, the preliminary scanning of the black phasing mark 151 in the transmitting cylinder sends a carrier signal over the lines L1, L2 to the recorder where the energized relay 217 closes the switches 221 and 222 to energize the scanning motor 225 and put a positive potential on line L1. This positive potential operates a polarized relay 230 at the transmitter to move the armature 231 against the M contact.

The winding of relay 230 is connected to line L1 by a wire 232 which contains a choke coil 233 to prevent the passage of carrier frequency through the relay. A pair of blocking condensers 234 and 235 in lines L1 and L2 at the output end of amplifier 209 prevent any direct current potential bias impressed on the transmission lines from interfering with the carrier frequency. The choke coil 233 preferably has a grounded condenser 233' connected in series to act as a bypass for shunting any inductive surge produced by a reversal of potential on line L1 away from the winding of relay 230.

Still referring to Fig. 16, the armature of polarized relay 230 is connected to the auxiliary bus bar A' and the contact M is connected by a wire 236 to one side of a relay 237, the other side of which goes to bus bar B. Therefore, when the M contact of relay 230 is closed, the relay 237 is energized and closes its contacts 238—239 which are normally open. The movable contact 238 is connected to bus bar A' and the other contact 239 is connected to one side of the solenoid 119 which operates the half nut 117. The other side of solenoid 119 goes to bus bar B. It will thus be seen that the positive potential put on line L1 at the recorder automatically connects the scanning carriage CR of the transmitter to the feed screw 109. The transmitter is now in full operation and the recorder makes a record of the transmitted copy.

The relay 237 also operates a pair of break contacts 240—241 and a pair of make contacts 240—241'. When the relay 237 is energized by the positive potential on line L1, the switch contacts 240—241' are closed to put a positive potential on line L2 from a rectifier 242. This is done through the following connections:

The rectifier 242 is connected to the power mains A' and B so that it is energized when the starting switch 164 is closed. The output lines 243 and 244 of the rectifier are controlled by a relay 245 which has a pair of make contacts 246—247, break contacts 246—246', make contacts 248—248', and break contacts 248—249. The contacts 246' and 248' are connected to the positive lead 243 of the rectifier. The contacts 247 and 249 are connected to the negative lead 244 of the rectifier through a resistor 250. The movable contact member 248 is grounded and the other contact member 246 is connected by a wire 251 to the contact 241' of relay 237. When this relay is energized, positive potential goes from line 243 through closed contacts 246'—246, wire 251, closed contacts 241'—240, wire 252, closed relay switch 253, wire 254, and through choke coil 255 to the line L2. The choke coil 255 may have a grounded condenser 255' connected in series for the same purpose as condenser 233' for choke coil 233 on line L1.

The positive potential impressed at the transmitter on line L2 affects the recorder in this way: A polarized relay 256 is connected to line L2 and its armature 257 is connected to the bus bar C. When this relay is energized by the positive potential on line L2, the armature 257 closes the contact M' which is connected by a wire 258 to one side of a blank feeding and mounting mechanism represented by the labeled rectangle BF. The other side of this mechanism is connected by a wire 259 to the bus bar D. For the details of mechanism BF, which is not part of our present invention, see the Ridings and Wise Patent No. 2,386,263 previously mentioned. It will be understood then that the positive potential impressed on line L2 at the transmitter energizes the mechanism BF at the recorder to feed a blank to the recording cylinder 215 and mount it thereon in position to be engaged by the recording stylus 214.

Still referring to Fig. 17, it should be noted here that the closing of contact M' by the armature 257 also closes the circuit of a relay 260 which has one side connected to contact M' by wires 258 and 261. The other side of relay 260 is connected by a wire 262 to bus bar D. When the relay 260 is energized, it breaks its contacts 263—264 and thereby prevents the energizing of the blank stripping mechanism ST, the details of which are set forth in the aforementioned Patent No. 2,386,263. One terminal of mechanism ST is connected by a wire 265 to bus bar C and the other terminal goes to bus bar D through a control device 266, wire 267, relay switch 263—264 and wire 268. The rectangle 266 represents an arrangement for preventing operation of the stripping mechanism before the relay 260 is energized to open the switch 263—264. Such an arrangement is fully disclosed in Fig. 14 of Patent No. 2,386,263 and requires no description here since it is not a part of our invention.

We now have the transmitter and the recorder in operative condition so that the scanned copy in the transmitter is recorded by the stylus 214 in the recorder. The positive potential remains on line L2 during the scanning operation until the carriage CR reaches the end of its downward movement and closes the switch 189. Thereupon the following operations take place automatically:

At the transmitter a relay 269 is energized through a circuit including a wire 270 which connects one side of the relay with bus bar A' through the closed switch 189, the other side of the relay being connected to the power main B. The energized relay breaks its contact 253 and thereby removes the positive potential from line L2. The closing of relay contacts 271—272 closes the direct current circuit of relay 273 which closes its contacts 274 to energize the solenoid 199 and operate the marking device MK.

At the recorder the removal of positive potential from line L2 breaks the contact M' which releases the relay 260 to close the contacts 263—264, whereby the mechanism ST is energized to strip the recorded blank from cylinder 215. At the completion of the stripping operation a relay 275 is energized to open the switch 228 and close the switch 276, whereby the positive potential on line L1 is replaced with a negative potential from a suitable source 277. In Fig. 17, the relay 275 is shown connected to the stripping mechanism ST through a normally closed switch 278 of a relay 279 which is not energized now. For full details of how the relay 275 is automatically energized at the completion of the stripping cycle, see the aforesaid Patent No. 2,386,263.

At the transmitter the negative potential on line L1 causes the armature 231 of polar relay 230 to close the contact S which is connected to one side of a relay 280 by a wire 281. The other side of this relay goes to the bus bar B. Therefore the closing of contact S by armature 231 energizes the relay 280, which closes three pairs of contacts 282—283, 284—285 and 286—287. The two movable contacts 282 and 284 are connected to bus bar A' and the other movable contact 286 is connected by a wire 288 to contact 241 of relay 237. Contact 283 is connected by a wire 289 to relay 245, and contact 285 is connected by a wire 290 to one terminal of the turret motor 139. Contact 287 of relay 280 is connected to wire 251.

Still at the transmitter, the negative potential on line L1 causes the polarized armature 231 to break the M contact, whereby the relay 237 is deenergized and the open switch 238—239 breaks the circuit of solenoid 119. Consequently, the half-nut 117 is withdrawn from the screw shaft 109 and the scanning carriage CR is instantly pulled up by the spring drums 139 and 140. The initial upward movement of the carriage opens the switch 189 so that the relay 269 is deenergized with the instant release of relay 273 and the marking solenoid 199. The circuit of relay 273 may include a condenser 291 shunted by a resistor 292 to accelerate the deenergizing of the relay, whereby the marking solenoid 199 receives a momentary impulse to mark the scanned copy.

The closing of its three switches by the energized relay 280 results in the following operations which take place automatically in the transmitter upon completion of the stripping cycle in the recorder:

1. The closing of switch 282—283 energizes the solenoid 172 through a wire 293 to withdraw the latch 166 from the turret, which is now released for the next operation.

2. The outward movement of latch 166 opens the switch 181 to deenergize the solenoid 72 which allows the clutch K to drop down and disconnect the shaft 26 of the scanned cylinder from the running motor 54. This happens just before the turret motor 39 is energized.

3. The closing of switch 284—285 energizes the motor 39 to rotate the turret to the next scanning position. The initial movement of the turret causes the shaft 26 that engages the arm 185 to swing the latter outward and close the switch 180 through which the circuit of motor 39 is completed after the relay 280 is deenergized. When the turret reaches its next stop, the arm 185 is pulled inward by its spring to open the switch 180, whereupon the turret motor 39 stops.

4. When the solenoid 172 is energized to withdraw the latch 166, the relay 245 is also energized through the closed switch 282—283 of relay 280. The closing of switch 246—247 of relay 245 puts a negative potential on line L2 through the following connections: From the negative lead 244 of rectifier 242 through closed switch 246—247, wire 251 to point 251', closed switch 286—287 of energized relay 280, wire 288, closed switch 240—241 of deenergized relay 237, wire 252, closed switch 253 of deenergized relay 269, wire 254 and finally through choke coil 255 to line L2.

5. At the recorder, the negative potential on line L2 closes contact S' of the polarized relay 256 whereby the relay 279 is energized to open its contacts 278. This breaks the circuit of relay 275, thereby removing the negative potential from line L1 and replacing it with a positive potential from the source 229 through the closed switch 228.

6. At the transmitter, the positive potential on line L1 closes the M contact of polarized relay 230, thereby deenergizing the relays 245 and 280 and again energizing the solenoid 237 to connect the half-nut 117 of the scanning carriage to the feed shaft 109. The release of relay 245 removes the negative potential from line L2 which receives a positive potential while the relay 237 is energized. Therefore, the scanning cycle starts all over again for the next cylinder, as previously described.

It will thus be clear that the cylinders in the transmitter turret are scanned in automatic sequence due to novel control connections between the transmitter and the recorder, each machine controlling certain operations in the other. After the attendant has loaded the cylinders on the turret and turned the starting knob 155 to the last loaded cylinder, the transmitter keeps on going by itself until the last copy has been scanned and transmitted to the recorder, whereupon both machines automatically stop. In a transmitter which we have built and operated, it takes but one minute to scan each cylinder and three seconds to bring the next cylinder into scanning position.

The transmitter as made for commercial use is enclosed in a sheet metal case 294 which covers all the mechanism except the cylinders 23 and the switch knob 155, as shown in Fig. 18. The case 294 has a shelf 295 with a circular opening 296 for accommodating the turntable 18 which is flush with the shelf. At the rear edge of the horizontal shelf 295 rises a vertical wall or panel 297 which has a vertical slot 298 for passage of the scanning beam to the copy in cylinder 23a. The scanning slot 298 may be covered with glass or other transparent material to make the case completely dustproof. This case is so constructed that it can be placed over the base of the machine and removed therefrom as a unit, and it can be made as attractive as desired. The various electrical parts and circuit connections of Fig. 16 that are not mounted on the base 10 can be enclosed in a cabinet or stand on which the machine is supported. As indicating the compactness of our multi-cylinder transmitter, we might mention that the case 294 stands only 16 inches high and is less than 13 inches square in the base.

*Summary of operation*

The operation of our multi-cylinder transmitter will be fully understood from the detailed description given, but for a quick review we present a summary of the sequence of operations in the transmitter and in the distant recorder associated therewith.

*At the transmitter.*—The switch knob 155 is turned to indicate the last loaded cylinder whereupon the starting switch 164 is closed and signal carrier is sent to the recorder. The scanning carriage CR is not yet connected for operation.

*At the recorder.*—The power circuit is closed by the energizing of line relay 217 and the motor 225 is energized to operate the scanning cylinder 215. At the same time a positive potential is impressed on line L1 from the source 229.

*At the transmitter.*—The positive potential on line L1 causes the solenoid 119 to be energized and the half-nut 117 connects the carriage CR to the screw shaft 109 for scanning operation. Also a positive potential is put on line L2 and this potential remains until the carriage reaches the end of its downward travel.

*At the recorder.*—The positive potential on line L2 causes the mechanism BF to mount a blank on cylinder 215 and the machine is now ready to record the copy coming from the transmitter.

*At the transmitter.*—The scanning of copy in cylinder 23a continues. At the end of this operation the carriage CR closes the switch 189, whereupon the relay 269 is energized to actuate the marker MK and to remove the positive potential from line L2.

*At the recorder.*—The removal of positive potential from line L2 operates the stripping mechanism ST to remove the recorded sheet from the cylinder 215. At the end of the stripping operation the relay 275 is energized to replace the positive potential on line L1 with a negative potential.

*At the transmitter.*—The negative potential on line L1 causes the energizing of relay 280 whereby a negative potential is put on line L2; the latch 166 is withdrawn; the clutch K is released, and the motor 39 is energized to move the turntable 18 to the next scanning position.

*At the recorder.*—The negative potential on line L2 causes the release of relay 275 whereby a positive potential is again impressed on line L1.

*At the transmitter.*—The positive potential on line L1 connects the carriage CR for scanning movement and the same cycle of operations takes place for each succeeding cylinder.

*Modifications (Figs. 19–24)*

It will be apparent that several features of our multi-cylinder transmitter are also applicable to a machine with one cylinder. Among such features are the copy holding means inside the cylinder, the scanning carriage with its driving mechanism, and the outer case or cover for the machine.

In Fig. 19, a one-cylinder machine embodying the copy holding means and the scanning carriage of the multi-cylinder machine is enclosed in a case 300 shaped to fit over the inside mechanism like the case 294 of Fig. 18. The case 300 has a self 301 provided with a circular opening 302 in which a rotary disk 303 operates for supporting a cylinder 304 in scanning position. The disk 303 corresponds to the disk 27 in Fig. 5 and is rotated in the same way except that the connections between the disk 303 and the driving motor need not be separable. It will be understood then what has been said for the scanning cylinder 23a in the multi-cylinder machine applies to the single cylinder 304 in Fig. 19.

The optical scanning mechanism in the transmitter of Fig. 19 is the same as that in Fig. 18 and the scanning beam strikes the copy in cylinder 304 through a vertical slot 305 in the panel 306 of casing 300. The vertical panel 306 may have a concave recess 307 concentric with the cylinder 304 for receiving the scanning slot 305. The case 300 may be entirely of sheet metal or the shelf 301 may be a separate piece of Bakelite or similar material of suitable color and secured in place by screws 308. A button 309 for operating a suitable starting switch projects through the shelf 301. The case 300, which is attractive in appearance, is removable and replaceable as a unit without disturbing the inside mechanism. In a machine actually constructed as shown in Fig. 19, the case is but 8½ inches square and 12 inches high.

Figs. 20 and 21 show a transparent scanning cylinder 310 provided inside with copy holding means adapted to be adjusted by hand to holding and releasing position as distinguished from the automatic centrifugal adjustment of the copy holding members 33. This manually operable copy holder comprises a group of spring fingers 311 mounted on the base 312 of cylinder 310 and arranged circularly with uniform spacing. A single disk 313 holds all the fingers in place. This disk is secured to the base 312 by screws 314 and the ends 315 of fingers 311 enter radial recesses 316 in a snug fit, there being a separate recess for each finger. When the disk 313 is screwed in place, the ends of the spring fingers are firmly clamped to the base 312 on which the cylinder 310 is secured by screw threads or otherwise. The inherent set of the spring fingers 311 is such that normally they lie away from the cylinder 310 near the axis thereof.

A shaft 317 is screwed to the top of a rotary shaft 318 to which the base 312 is attached and by means of which the cylinder is rotated, as previously described for cylinders 23 and their driving shafts 26. The shaft 317 extends centrally upward in cylinder 310 and has mounted thereon a slidable sleeve 319 which carries at its lower end a disk 320. The upper end of sleeve 319 is provided with a suitable fingerpiece 321, and a pin 322 on shaft 317 enters a slot 323 in the sleeve to limit the upward movement thereof. The disk 320 has a slightly concave periphery adapted to engage the inwardly projecting shoulders 324 of the spring fingers 311 when the disk is in down position. The spring fingers 311 are formed with inclined cam portions 325 above the shoulders 324.

When the knob 321 is pulled out until the pin 322 stops the sleeve 319, the disk 320 is lifted out of engagement with the shoulders 324, as indicated by the dotted outline 320'. The spring fingers 311 are thus free to move inwardly to their normal position 311' out of contact with the inner wall of the cylinder. This permits easy insertion of copy 326 into the cylinder, the lower edge of the copy (which may be a thin sheet or a card) resting on the base disk 312. The attendant pushes the knob 321 in as far as it will go, thereby causing the disk 320 to ride down over the inclines 329 and spread the fingers 311 radially outward against the copy 326.

The spring fingers 311 are slightly concave lengthwise in normal condition as indicated by the dotted lines 311'. Therefore, when the fingers are pressed against the copy, as shown in Fig. 21, the pressure is substantially uniform along the entire contact length of the fingers. The shoulders 324 are shaped to fit into the concave groove at the periphery of disk 320 whereby the spring fingers are locked in holding position without offering undue resistance to the outward pull of the operating knob 321.

In Figs. 22 and 23 the copy holding device consists of cylindrical sectors 327 mounted in the transparent cylinder 328 in the same way as sectors 33 in Fig. 5. The sectors 327, which present a cylindrical contact surface to the inserted copy 329, are mounted on the cylinder base 330 so as to slide radially outward and inward. Pins 331 on the bottom of the sectors extend loosely into holes 332 in the base 330 to prevent the sectors from circular displacement on the base during rotation of the cylinder. The base 330 is fixed on top of a rotary shaft 333 which carries an extension 334 screwed into the top of the shaft. The extension 334 goes centrally through the cylinder and serves as a shaft for slidably supporting a sleeve 335 which is locked to the shaft by a pin and slot connection 336—337. This connection permits a limited slidable movement of sleeve 335 on shaft 334, which preferably carries a leaf spring 334' to impose a friction load on the sleeve. On the top of sleeve 335 is a suitable fingerpiece 338 which is shown as a knurled knob.

The sleeve 335 has an outer surface 335' of conical shape adapted to pass through conical openings 339 and 340 in the cylindrical sectors 327. It is apparent from Fig. 23 that when the cone-shaped sleeve 335 is pushed in, the sectors 327 are forced radially outward to press the inserted copy 329 against the inner wall of the cylinder. When the sleeve 335 is pulled out, the sectors 327 become loose on the base 330 and permit ready withdrawal of the scanned copy. The holes 332 in base 330 are wide enough to permit the necessary radial movement of the sectors 327 into holding and releasing position. What has been said for the sectors 33 applies to the sectors 327, except that the sectors 33 move automatically into copy holding position by centrifugal force when the cylinder 23 is rotated, whereas sectors 327 are adjusted by manual operation of knob 338.

We would have it understood that the cylinder and copy holding devices shown in Figs. 21 and 23 can be embodied in the multi-cylinder machine or the single cylinder machine previously described. The chief practical advantage of the manually adjustable copy holders of Figs. 21 and 23 lies in the fact that scanning cylinders equipped with those devices can be mounted in vertical as well as horizontal position, whereas the centrifugal sectors 33 operate properly in vertical position only.

In another form of our invention the scanning cylinder may have the copies mounted on the outside as shown in Fig. 24 where the copies 341 are coiled over the cylinders 342 and held in place by garter springs 343. In this case, the cylinders 342 need not be transparent but may be of sheet material or other opaque material. By way of example, we have shown four cylinders mounted on a turntable 344, which may be assumed to take the place of turntable 18. The optical scanning mechanism is diagrammatically represented by the outline 345 and requires no further description.

While we have shown and described certain specific structures, these are to be considered as illustrative embodiments of our invention and not as a restriction or limitation thereof. It is apparent that changes and modifications may be resorted to within the scope of the invention as defined in the appended claims. Nor is the use of our transmitter limited to a facsimile system with a recorder like that disclosed in the Ridings and Wise Patent No. 2,386,263. It so happens that this patent has certain control circuits that can be worked into a system embodying our multi-cylinder transmitter. We would have it understood, however, that in the broad aspect of our invention the transmitter is intended to be connected to any form or type of recorder provided with our novel control means for the transmitter to effect scanning of the cylinders in automatic sequence.

We claim as our invention:

1. Facsimile telegraph apparatus having optical scanning mechanism, means for supporting a plurality of transparent cylinders in vertical position, each cylinder being adapted to hold copy inside for scanning by said mechanism, and automatic means for placing said cylinders successively into operative relationship with said scanning mechanism.

2. A facsimile machine having a movable support which carries a plurality of rotary cylinders, a scanning device for said cylinders, timed means for automatically moving said support after each scanning operation to place said cylinders one at a time in operative relation to said device, whereby said cylinders are scanned in automatic sequences, means including a releasable connection for rotating the cylinder that is in scanning position, the other cylinders remaining stationary on said support during the scanning operation, and timed means for automatically releasing said connection after each scanning operation.

3. In a facsimile system, a transmitter having a plurality of copy holders permanently mounted on a movable support, scanning mechanism for said copy holders, a recorder operatively connected with said transmitter, and means controlled by said recorder for automatically operating said support after each scanning operation to bring the next copy holder into scanning position whereby said copy holders are scanned in automatic sequence.

4. In a facsimile system, a transmitter having a turntable, a plurality of rotary cylinders mounted on said turntable, scanning mechanism for said cylinders, a motor for operating said turntable to bring the cylinders successively into scanning position, means for rotating the cylinder that is being scanned, a recorder operatively connected with said transmitter, and means controlled by said recorder after each scanning operation for activating said turntable motor and said cylinder rotating means.

5. In a facsimile transmitter, a turntable having a plurality of copy holding cylinders rotatably mounted thereon, a scanning device for said cylinders, mechanism for intermittently rotating said turntable to move said cylinders successively into operative relation to said scanning device, a motor for rotating each cylinder in scanning position, a starting switch for said motor, and a finger piece mounted centrally of said turntable for operating said switch to energize the motor.

6. In a facsimile transmitter, a turntable having a plurality of copy holding cylinders circularly arranged and rotatably mounted thereon, a scanning device for said cylinders, mechanism for intermittently rotating said turntable to bring the cylinders successively into position for scanning by said device, a motor for rotating each cylinder in scanning position, a source of power for said motor, and scanning device, a starting switch connected with said source of power, a rotary finger piece mounted centrally of said turntable and provided with an indicator, said finger piece being adjustable to indicate any selected one of said cylinders, a connection operated by said finger piece to close said switch for energizing said motor and scanning device, and means associated with said connection for automatically opening said switch after scanning of the indicated cylinder.

7. In facsimile scanning apparatus, a cylinder for supporting a sheet inside, and adjustable means in said cylinder for holding an inserted sheet against the cylinder wall, said holding means providing a cylindrical contact surface substantially co-extensive with the sheet.

8. In facsimile scanning apparatus, a transparent cylinder provided inside with a plurality of cylindrical sectors which move radially outward to press an inserted sheet against the inner wall of the cylinder.

9. In facsimile scanning apparatus, an upright transparent cylinder mounted on a rotary base for supporting a sheet inside, and a plurality of members adjustably mounted on said base within the cylinder and movable outward to press the inserted sheet against the cylinder wall, said members being separately insertable into and removable from the cylinder.

10. In a facsimile transmitter, a cylinder for supporting copy in scanning position, means for scanning the supported copy, a copy marker associated with said cylinder, and a device for automatically operating said marker at a predetermined moment to mark the scanned copy.

11. A facsimile machine having a rotary transparent cylinder adapted to support a sheet inside for optical scanning, and means within the cylinder for holding the inserted sheet against the cylinder wall during rotation thereof, said means having a phasing mark left exposed by the inserted sheet.

12. A facsimile machine having a pair of nested cylinders between which a sheet is firmly held in cylindrical form for scanning, the outer cylinder being transparent for optical scanning of the sheet, the edges of the inserted sheet leaving a gap lengthwise of the cylinders, and a phasing mark on the inner cylinder left exposed by said gap independently of the angular position of the gap.

13. In facsimile apparatus, a transparent cylinder adapted to support a sheet inside for scanning, an adjustable finger piece mounted centrally of said cylinder, and means operated by said finger piece for clamping the inserted sheet against the inner surface of the cylinder, said clamping means normally permitting insertion of a sheet.

14. In facsimile apparatus, a transparent cylinder adapted to support a sheet inside for scanning, a plurality of adjustable members mounted within said cylinder and normally permitting insertion of a sheet, and manually operable means for spreading said members radially outward to clamp the inserted sheet against the inner surface of the cylinder.

15. In facsimile apparatus, a transparent cylinder adapted to support a sheet inside for scanning, a plurality of adjustable spring fingers mounted within said cylinder and having a normal bias away from the cylinder to permit insertion of a sheet, and a hand-operable member for spreading said fingers radially outward to clamp the inserted sheet against the inner surface of the cylinder.

16. A facsimile machine having a turntable which carries a plurality of scanning cylinders spaced at equal intervals, means whereby each cylinder is independently rotatable on said turntable, scanning mechanism for said cylinders, only one cylinder being in scanning position at a time, means for automatically operating said turntable after each scanning operation to move the cylinders successively into scanning position, and means for rotating the cylinder that is being scanned.

17. In facsimile telegraph apparatus, a turntable carrying a plurality of scanning cylinders mounted for independent rotation, scanning mechanism for said cylinders, only one cylinder being in scanning position at a time, means automatically energized after a scanning operation for rotating said turntable through a definite arc to move the next cylinder into scanning position, a continuously rotatable driving shaft normally disconnected from said cylinders to permit rotation of the turntable, and means for causing said shaft to rotate the cylinder that is being scanned.

18. In a facsimile machine, a turntable carrying a plurality of rotary supports in spaced circular arrangement, a vertical scanning cylinder mounted on each support whereby each cylinder is rotatable independently of the others, a central shaft extending downward from each cylinder support, mechanism for scanning said cylinders one at a time, means for automatically operating said turntable after each scanning operation to move the cylinders successively into scanning position, a vertical driving shaft in axial alignment with the shaft of the cylinder in scanning position and normally disconnected from said cylinder shaft, and means for releasably coupling said driving shaft to said cylinder shaft during the scanning operation.

19. In a facsimile machine, a turntable carrying a plurality of rotary scanning cylinders uniformly spaced around it, scanning mechanism for said cylinders, only one cylinder being in scanning position at a time, automatic means operable after each scanning operation for rotating said turntable through a definite arc to bring the next cylinder into scanning position, a device for locking the turntable in each adjusted position, means for rotating the cylinder that is being scanned while the turntable remains locked, and means for releasing said locking device for permitting rotation of the turntable to the next scanning position.

20. In a facsimile machine, a turntable having a plurality of rotary shafts depending therefrom and uniformly spaced in a circle, a corresponding plurality of vertical scanning cylinders rotatably supported on said turntable, each cylinder being mounted in axial alignment with a depending shaft and rotated thereby, mechanism for scanning said cylinders one at a time, means for intermittently rotating said turntable to move the cylinders successively into scanning position, an adjustable locking member arranged to engage a depending shaft to lock the turntable in each adjusted position, and driving means releasably connected to the depending shaft of the cylinder in scanning position for rotating said cylinder while the turntable remains locked.

21. In a facsimile machine of the vertical scanning type, a base member, a bracket member supported above said base member, a scanning carriage mounted to slide up and down between said members, means for moving said carriage downward at scanning speed from its normal raised position, and a pair of spring drums carried by said bracket member and connected to opposite sides of said carriage for lifting the same to normal position in which it is held by said spring drums.

22. In a facsimile machine of the vertical scanning type, a scanning carriage mounted to slide up and down, means for moving the carriage downward at scanning speed from its normal raised position, a pair of spring drums mounted at opposite sides of said carriage, and a flexible connection between each drum and an adjacent part of the carriage whereby the drums are wound up by the downward movement of the carriage to lift the same back to normal position in which it is held by the spring drums.

23. In a facsimile machine, a slidable scanning carriage comprising a substantially U-shaped piece of sheet metal which has a front plate and a pair of side plates, lens assemblies mounted on one of said side plates, a photocell mounted on the other side plate so as to receive the scanning beam from said lens assemblies, an electric motor supported in the chamber formed by said U-shaped piece, and a light chopper disk operated by said motor and arranged in the path of said scanning beam to interrupt the light at a predetermined frequency.

24. In a facsimile machine of the vertical scanning type, an upright post having a sleeve mounted thereon to slide up and down, a scanning carriage fastened to said sleeve and normally in raised position, a vertical screw shaft adjacent to said post, a half-nut pivotally mounted on said sleeve below the carriage and normally out of contact with said screw shaft, and means for swinging said half-nut into mesh with the screw shaft to move the carriage downward at scanning speed.

25. In a facsimile machine of the vertical scanning type, an upright post having a sleeve mounted thereon to slide up and down, a scanning carriage fastened to said sleeve and normally in raised position, a vertical rotary screw shaft adjacent to said post, a hub pivotally mounted on said sleeve and provided with a horizontal arm, a half-nut carried by said arm and having a pivotal adjusting movement thereon, said half-nut being normally out of contact with the screw shaft, and means for operating said arm to move the half-nut into mesh with the screw shaft.

26. In a facsimile machine, a supporting base member having a top plate with a shallow chamber beneath, a motor mounted on said base member, a vertical scanning cylinder mounted for rotation above said plate, a rotary screw shaft extending upward from said plate for supporting a scanning carriage in operative relation to said cylinder, a driving connection above said plate between the motor and the scanning cylinder, and a speed reducing gear drive in the chamber below the plate for operating the screw shaft from the motor.

27. A facsimile machine provided with a casing which encloses the operative mechanism of the machine, said mechanism including an optical scanning device, said casing having a low front section and a high rear section, the front section projecting forward to form a shelf and the rear section having a vertical front wall extending upward from said shelf, and a rotary vertical cylinder mounted above said shelf to support a sheet for scanning by said optical device, the front wall of said rear section having a vertical slot for passage of the scanning beam.

28. A facsimile machine provided with a casing which encloses the operative mechanism of the machine, said mechanism including an optical scanning device, said casing having a low front section and a high rear section, the front section projecting forward to form a shelf and the rear section having a vertical front wall extending upward from said shelf which has a circular opening, a turntable operatively mounted in said opening and substantially closing the same, and a plurality of vertical scanning cylinders rotatably mounted on said turntable which moves the cylinders successively into position for scanning by said optical device, the front wall of said rear section having a vertical slot for passage of the scanning beam.

29. A facsimile system comprising a transmitter and a recorder operatively connected, a turntable at the transmitter carrying a plurality of cylinders, a scanning device for said cylinders, a motor for intermittently operating said turntable to bring the cylinders successively into scanning position, a relay at the transmitter for controlling said motor, and apparatus at the recorder automatically responsive to the completion of a scanning operation in the transmitter for energizing said relay to operate said motor, whereby said cylinders are scanned in automatic sequence.

30. Facsimile apparatus having a plurality of cylinders mounted in fixed relationship on a common support, means for scanning said cylinders one at a time, a motor for operating said support to move the next cylinder into scanning position, mechanism automatically responsive to the completion of a scanning operation to energize said motor, whereby said cylinders are scanned in automatic sequence, a source of power for said apparatus, and a switch controlled by the movement of said support for automatically disconnecting said source of power after scanning of the last cylinder.

31. Facsimile apparatus provided with a plurality of cylinders mounted on a rotary support, means for scanning said cylinders one at a time, a motor for operating said support, a second motor for rotating the cylinder that is being scanned, mechanism automatically timed by a scanning operation for energizing said motor to rotate said support and thereby move the next cylinder into scanning position, a source of power for both motors, a device for connecting said motors to said source of power, and a member automatically operated after scanning of the last cylinder for causing said device to disconnect said source of power.

32. A facsimile system comprising a transmitter and a recorder operatively connected by transmission lines, said transmitter having a plurality of cylinders and means for scanning the same, mechanism for moving said cylinders successively into scanning position, apparatus at the recorder for automatically impressing a direct current voltage on one of said transmission lines at the close of a scanning operation in the transmitter, and instrumentalities in the transmitter responsive to said voltage for energizing said mechanism to scan said cylinders in automatic sequence.

33. A facsimile transmitter having a plurality of copy holding cylinders mounted in fixed spaced position on a rotary support, scanning means for said cylinders, a motor for rotating said support through a definite arc to move said cylinders successively into scanning position, a device automatically energized at the close of a scanning operation to energize said motor and rotate said support for scanning the next cylinder, and mechanism automatically operated when said support reaches the next scanning position to stop said motor, whereby said cylinders are scanned in automatic sequence during the stationary intervals of said support, the mounting and arrangement of the cylinders on said support being such that a scanned cylinder is readily accessible for unloading ad reloading while another cylinder is being scanned.

RALEIGH J. WISE.
ROBERT D. PARROTT.
GARVICE H. RIDINGS.

REFERENCES CITED

The following references are of record in the file of this patent:

UNITED STATES PATENTS

| Number | Name | Date |
|---|---|---|
| 1,370,800 | Egerton | Mar. 8, 1921 |
| 1,546,310 | Papadopoulos | July 14, 1925 |
| 1,907,881 | Rudolph | May 9, 1933 |
| 2,255,868 | Wise | Sept. 16, 1941 |
| 2,255,869 | Ridings | Sept. 16, 1941 |
| 2,262,715 | Wise | Nov. 11, 1941 |
| 2,265,339 | Blanton | Dec. 9, 1941 |
| 2,315,361 | Wise | Mar. 30, 1943 |
| 2,333,272 | Ridings | Nov. 2, 1943 |
| 2,351,231 | Ridings | June 13, 1944 |
| 2,356,116 | Ridings | Aug. 15, 1944 |
| 2,386,263 | Ridings | Oct. 9, 1945 |
| 2,392,442 | Wise | Jan. 8, 1946 |
| 2,451,046 | Rembert | Oct. 12, 1948 |

OTHER REFERENCES

The Story of Saran, booklet published by Dow Chemical Co., 18-VCI, copyright 1942, pages 23, and 11.